(12) United States Patent
Yin et al.

(10) Patent No.: US 11,281,252 B2
(45) Date of Patent: Mar. 22, 2022

(54) LIQUID CRYSTAL DISPLAY COMPRISING AN OPTICAL COMPONENT HAVING A COMPONENT BODY THAT IS COMPETELY OR PARTIALLY DISPOSED IN A PIN THROUGH-HOLE IN A BACKLIGHT AND ELECTRONIC DEVICE HAVING THE SAME

(71) Applicant: Huawei Technologies Co., Ltd., Shenzhen (CN)

(72) Inventors: Bangshi Yin, Shenzhen (CN); Fan Yang, Shenzhen (CN); Bin Yan, Shenzhen (CN); Kangle Xue, Shenzhen (CN); Xiaomeng Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/358,821

(22) Filed: Jun. 25, 2021

(65) Prior Publication Data
US 2021/0397215 A1     Dec. 23, 2021

Related U.S. Application Data

(63) Continuation of application No. 16/608,560, filed as application No. PCT/CN2017/090090 on Jun. 26, 2017, now Pat. No. 11,048,294.

(30) Foreign Application Priority Data

Apr. 25, 2017  (CN) .......................... 201710279141.5

(51) Int. Cl.
*G06F 1/16*     (2006.01)
*G02F 1/1333*  (2006.01)
(Continued)

(52) U.S. Cl.
CPC .......... *G06F 1/1605* (2013.01); *G02F 1/1333* (2013.01); *G02F 1/1337* (2013.01);
(Continued)

(58) Field of Classification Search
CPC ................... G06F 1/1605; G03B 29/00; G02F 2001/133388; G02F 1/133388;
(Continued)

(56) References Cited

U.S. PATENT DOCUMENTS

| 9,543,364 B2 | 1/2017 | Rappoport et al. |
| 2009/0102763 A1 | 4/2009 | Border et al. |

(Continued)

FOREIGN PATENT DOCUMENTS

| CN | 2432196 A1 | 3/2012 |
| CN | 102385181 A | 3/2012 |

(Continued)

*Primary Examiner* — Paul C Lee
(74) *Attorney, Agent, or Firm* — Conley Rose, P.C.

(57) ABSTRACT

A liquid crystal display (LCD) includes several transparent material layers and several non-transparent material layers that are disposed in a stacked mode. The LCD also has a local transparent region, and no non-transparent material is applied to the several non-transparent material layers in the local transparent region. This forms a transparent channel in the local transparent region along a stacking direction. An optical component is completely or partially disposed in the transparent channel of the LCD display. The optical component may be a camera, an ambient light sensor, an optical fingerprint sensor, or another component disposed under the display by using the local transparent region on the LCD display.

20 Claims, 21 Drawing Sheets

(51) Int. Cl.
*G02F 1/1335* (2006.01)
*G02F 1/1337* (2006.01)
*G02F 1/1339* (2006.01)
*G02F 1/1362* (2006.01)
*G02B 27/01* (2006.01)
*H04M 1/02* (2006.01)

(52) U.S. Cl.
CPC ...... *G02F 1/1339* (2013.01); *G02F 1/133512* (2013.01); *G02F 1/133528* (2013.01); *G02F 1/136209* (2013.01); *G06F 1/1637* (2013.01); *G06F 1/1686* (2013.01); *G02B 2027/0138* (2013.01); *G02F 1/133302* (2021.01); *G02F 1/133388* (2021.01); *G02F 1/133565* (2021.01); *G02F 2202/28* (2013.01); *H04M 1/0264* (2013.01)

(58) Field of Classification Search
CPC ... G02F 2001/133302; G02F 1/133302; G02F 2001/133565; G02F 1/133565
See application file for complete search history.

(56) References Cited

U.S. PATENT DOCUMENTS

| | | | |
|---|---|---|---|
| 2010/0164921 A1 | 7/2010 | Ino et al. | |
| 2010/0315570 A1 | 12/2010 | Mathew et al. | |
| 2011/0261283 A1* | 10/2011 | Kim | H04N 5/2257 349/58 |
| 2012/0212701 A1 | 8/2012 | Hwang et al. | |
| 2012/0327325 A1 | 12/2012 | Park et al. | |
| 2014/0063407 A1 | 3/2014 | Kwon et al. | |
| 2014/0204244 A1 | 7/2014 | Choi et al. | |
| 2015/0036061 A1 | 2/2015 | Chen | |
| 2015/0241732 A1 | 8/2015 | Kim et al. | |
| 2015/0338672 A1 | 11/2015 | Fang et al. | |
| 2016/0011633 A1* | 1/2016 | Watanabe | G09G 3/3648 345/184 |
| 2016/0103345 A1 | 4/2016 | Lee et al. | |
| 2016/0126256 A1 | 5/2016 | Hwang et al. | |
| 2016/0202516 A1* | 7/2016 | Watanabe | G02F 1/1339 349/130 |
| 2017/0059771 A1* | 3/2017 | Yuki | G02B 6/0088 |
| 2017/0068287 A1* | 3/2017 | Jung | G06F 1/1637 |
| 2017/0090113 A1 | 3/2017 | Yuki et al. | |

FOREIGN PATENT DOCUMENTS

| | | |
|---|---|---|
| CN | 102841457 A | 12/2012 |
| CN | 103192768 A | 7/2013 |
| CN | 103676332 A | 3/2014 |
| CN | 102636896 B | 3/2015 |
| CN | 204331686 U | 5/2015 |
| CN | 105282126 A | 1/2016 |
| CN | 106094990 A | 11/2016 |
| CN | 205721727 U | 11/2016 |
| CN | 106506742 A | 3/2017 |
| CN | 106530965 A | 3/2017 |
| CN | 206060843 U | 3/2017 |
| EP | 2447766 A1 | 5/2012 |
| EP | 2565603 A2 | 3/2013 |
| JP | S63135122 A | 6/1988 |
| JP | H0255774 U | 4/1990 |
| JP | 2009071438 A | 4/2009 |
| JP | 2011504242 A | 2/2011 |
| JP | 2011050424 A | 3/2011 |
| JP | 2011234181 A | 11/2011 |
| JP | 2014103458 A | 6/2014 |
| JP | 2016071026 A | 5/2016 |
| WO | 2014141893 A1 | 9/2014 |
| WO | 2015178302 A1 | 11/2015 |

* cited by examiner

LIQUID CRYSTAL DISPLAY COMPRISING AN OPTICAL COMPONENT HAVING A COMPONENT BODY THAT IS COMPETELY OR PARTIALLY DISPOSED IN A PIN THROUGH-HOLE IN A BACKLIGHT AND ELECTRONIC DEVICE HAVING THE SAME

CROSS-REFERENCE TO RELATED APPLICATIONS

This is a continuation of U.S. patent application Ser. No. 16/608,560 filed on Oct. 25, 2019, now U.S. Pat. No. 11,048,294, which is a National Stage of International Patent Application No. PCT/CN2017/090090 filed on Jun. 26, 2017, which claims priority to Chinese Patent Application No. 201710279141.5 filed on Apr. 25, 2017. All of the aforementioned applications are hereby incorporated by reference in their entireties.

TECHNICAL FIELD

The present invention relates to the field of an LCD display, and in particular, to an LCD display, an electronic device, and an LCD display manufacturing method.

BACKGROUND

Currently, an electronic device with a large-size liquid crystal display (liquid crystal display, LCD) is more popular among consumers. However, a screen-to-body ratio of the electronic device is still limited in current level and does not meet consumers' expectations, and consequently, an appearance of the electronic device is not aesthetic. As competition of electronic devices is increasingly intense, if electronic devices have almost same functions, an appearance becomes an important factor for purchasing an electronic device by a consumer. Therefore, increasing a screen-to-body ratio of an electronic device is a mainstream of electronic device manufacturers in the future.

SUMMARY

Embodiments of the present invention provide an LCD display, an electronic device, and an LCD display manufacturing method, to increase a screen-to-body ratio of an electronic device.

According to a first aspect, an embodiment of the present invention provides an LCD display, where the LCD display is disposed in an electronic device. The LCD display includes several transparent material layers and several non-transparent material layers that are disposed in stack mode, and no non-transparent material is applied to each non-transparent material layer in a local transparent region on the LCD display (in other words, no non-transparent material is processed in the local transparent region at the several non-transparent material layers), to form a transparent channel in the local transparent region along a stacking direction. A component body of an optical component matching the LCD display is completely or partially disposed in the transparent channel of the LCD display.

According to this embodiment of the present invention, no non-transparent material is retained in the local transparent region at each non-transparent material layer on the LCD display to form the transparent channel in the local transparent region along the stacking direction, the component body of the optical component is completely or partially disposed in the transparent channel, and the component body of the optical component is completely or partially disposed on the LCD display, so that a larger size of the LCD display can be formed on the electronic device, a screen-to-body ratio of the electronic device is improved, and visual experience of the electronic device is further improved.

In a possible embodiment, because the non-transparent material is non-transparent, to increase a transmittance in the local transparent region, a position, at the non-transparent material layers on the LCD display, to which no non-transparent material is applied needs to be filled with a transparent filler or a liquid crystal material. The position, at the non-transparent material layers on the LCD display, to which no non-transparent material is applied is filled with the transparent filler or the liquid crystal material, so that light transmission of the LCD display is improved, and air gaps generated after no non-transparent material is applied to the several non-transparent materials in the local transparent region can be eliminated. In addition, an existing liquid crystal may be used as the liquid crystal material for filling without adding a device or a process of another filling material.

In a possible embodiment, no transparent filler or liquid crystal material fills the position, at the non-transparent material layer on the LCD display, to which no non-transparent material is applied. If no transparent filler or liquid crystal material fills the position, a manufacture process is easier, and a light transmission requirement of some optical components can also be satisfied.

In a possible embodiment, a material layer that is in the LCD display and whose transmittance is less than a threshold is defined as a non-transparent material layer, and a material layer that is in the LCD display and whose transmittance is greater than a threshold is defined as a transparent material layer. In this embodiment of the present invention, the transparent material layer includes a CG (cover glass) cover glass, a first LCD glass substrate, and a second LCD glass substrate, and the non-transparent material layer includes a first polarizer, a color film, a liquid crystal layer, a thin film transistor, a second polarizer, and a backlight module. The first polarizer, the first LCD glass substrate, the CF (color filter, CF), the liquid crystal layer, the thin film field effect transistor (or thin film transistor, TFT), the second LCD glass substrate, the second polarizer, and the backlight module are sequentially formed on a lower surface of the CG cover glass. In addition, no non-transparent material is applied to each of the first polarizer, the CF, the liquid crystal layer, the TFT, the second polarizer, and the backlight module in the local transparent region. The transparent channel is formed in the local transparent region along the stacking direction, so that the component body of the optical component can be completely or partially disposed in the transparent channel of the LCD display.

In a possible embodiment, in addition to the transparent material layer, there is further an ITO layer on a lower surface of the first LCD glass substrate and on an upper surface of the second LCD glass substrate. An electrical signal is applied to the ITO layer, to produce an electric field for controlling liquid crystal deflection. An ITO layer is still processed in several transparent channels, and is connected to a corresponding electrical signal. For example, an ITO layer in a region corresponding to a transparent channel on the first LCD glass substrate is also connected to an ITO layer in another region, and a same electrical signal is used; and an ITO layer in a region corresponding to a transparent channel on the second LCD glass substrate is connected to an independent control electrical signal, for example, a control electrical signal of one or several pixels in an original region corresponding to the transparent channel may be used. Voltage is applied to the two ITO layers, to produce an electric field for controlling deflection of a liquid crystal material in the transparent channels, so that a large amount of light can pass through the regions corresponding to pin-through-holes, thereby achieving a local transparent effect.

In a possible embodiment, in addition to the transparent material layer, the transparent material further includes a first alignment film and a second alignment film, the liquid crystal layer is formed between a lower surface of the first alignment film and an upper surface of the second alignment film, and the first alignment film and the second alignment film are used to provide a specific initial deflection to a liquid crystal in a case of no electric field. No alignment film is processed in the local transparent region on the first alignment film and the second alignment film, and a liquid crystal material is dripped into the region. Due to lack of restriction from the first alignment film and the second alignment film, alignments of liquid crystal materials filled in a pin-through-hole are disordered, and the liquid crystal materials are represented as isotropic materials. In this way, a large amount of light can pass through a region corresponding to the pin-through-hole, thereby achieving a local transparent effect.

In a possible embodiment, no transparent material is applied to the first LCD glass substrate and the second LCD glass substrate in the local transparent region, to form the transparent channel in the local transparent region along the stacking direction. In addition, after no transparent material is applied to the first LCD glass substrate and the second LCD glass substrate in the local transparent region, there is no need to resolve a problem of air gaps between the first LCD glass substrate and the second LCD glass substrate. Further, the component body of the optical component may be disposed in a light channel, thereby reducing an overall thickness.

In a possible embodiment, a transparent material is processed in the transparent channel at the several transparent material layers.

Specifically, the transparent material is processed in the transparent channel at the several transparent material layers, to form the transparent channel in the transparent region in stack mode. No additional manufacture process is needed, manufacture costs are reduced, and a full screen display effect is not affected. In addition, the transparent material is processed in the local transparent region at the several transparent material layers, so that mechanical strength of the LCD display can be increased, and overall quality of the LCD display can be improved.

In a possible embodiment, no transparent material is processed in the local transparent region on the CG cover glass, to form the transparent channel in the local transparent region along the stacking direction. No transparent material is processed in the local transparent region on the CG cover glass, to transmit voice to a component such as a receiver.

In a possible embodiment, a sealing material is applied to a periphery of the transparent channel of the several non-transparent layers. The sealing material is applied to the periphery of the transparent channel of the several non-transparent layers, so that there is no liquid crystal in a region isolated by using the sealing material. Alternatively, a sealing material or an ink applied to a backside of the CG cover glass may be used to shelter a cabling region.

In a possible embodiment, a length-width ratio of a display dimension of a rectangular display region without a transparent channel on the LCD display is 16:9, 18:9, or another standard video format ratio.

According to a second aspect, an embodiment of the present invention provides an electronic device. The electronic device includes an optical component and an LCD display, and a component body of the optical component is completely or partially disposed in a transparent channel of the LCD display.

According to this embodiment of the present invention, a structure of the LCD display is designed to implement a local transparent region, so that outside light can enter optical components such as a front-facing camera, an ambient light sensor, an optical sensor, and an optical fingerprint sensor that are disposed under the LCD display, and a full screen display effect is achieved in combination with layout optimization of components such as a camera and a receiver.

In a possible embodiment, the optical component includes at least one of an optical fingerprint sensor, a camera, an optical proximity sensor, a structured light sensor, an infrared laser transmitter, and an ambient light sensor.

According to a third aspect, an embodiment of the present invention provides an LCD display.

The LCD display includes several transparent material layers and several non-transparent material layers that are disposed in stack mode, and no non-transparent material is processed in a local transparent region on the LCD display at each non-transparent material layer, to form a component channel in the local transparent region along a stacking direction. A fingerprint sensor is completely or partially disposed in the component channel of the LCD display.

According to this embodiment of the present invention, no non-transparent material is processed in the local transparent region at each non-transparent material layer, to form the component channel in the local transparent region along the stacking direction. The fingerprint sensor is completely or partially disposed under the component channel of the LCD display or partially disposed in the component channel.

In a possible embodiment, the fingerprint sensor may be a capacitive fingerprint sensor. A display may be disposed on two sides of the capacitive fingerprint sensor, to increase a screen-to-body ratio.

According to a fourth aspect, an embodiment of the present invention provides an LCD display manufacturing method. The LCD display manufacturing method includes: determining, based on a structural design of an entire machine, a local transparent region disposed on an LCD display, where the LCD display includes several transparent material layers and several non-transparent material layers; cutting off a non-transparent material from each non-transparent material layer in the local transparent region, to form a transparent channel in the local transparent region along a stacking direction, where a component body of an optical component is completely or partially disposed in the transparent channel of the LCD display; and combining the several transparent material layers and the several non-transparent material layers.

According to this embodiment of the present invention, optical components such as a camera, an ambient light sensor, an optical sensor, and an optical fingerprint sensor and another component may be disposed under the display by using the transparent region on the LCD display, thereby greatly increasing a screen-to-body ratio and achieving a full screen effect.

In a possible embodiment, because the non-transparent material is non-transparent, to form the local transparent region, a position, at the non-transparent material layers on the LCD display, in which no non-transparent material is processed needs to be filled with a transparent filler or a liquid crystal material. The position, at the non-transparent material layers on the LCD display, in which no non-transparent material is processed is filled with the transparent filler or the liquid crystal material, so that light transmission of the LCD display is improved, and air gaps generated after no non-transparent material is processed for the several non-transparent materials can be eliminated. In addition, an existing liquid crystal may be used as the liquid crystal material for filling without adding a device or a process of another filling material.

In a possible embodiment, the transparent material layer includes a CG cover glass, a first LCD glass substrate, and a second LCD glass substrate, and the non-transparent material layer includes a first polarizer, a color film, a liquid crystal layer, a TFT, a second polarizer, and a backlight module. The first polarizer, the first LCD glass substrate, the CF, the liquid crystal layer, the TFT, the second LCD glass substrate, the second polarizer, and the backlight module are sequentially formed on a lower surface of the CG cover glass. In addition, no non-transparent material is processed in the local transparent region at each of the first polarizer, the CF, the liquid crystal layer, the TFT, the second polarizer, and the backlight module. The transparent channel is formed in the local transparent region along the stacking direction, so that the component body of the optical component can be completely or partially disposed in the transparent channel of the LCD display.

In a possible embodiment, based on the designed transparent region, during manufacturing of the LCD display, no processing is performed in regions that are corresponding to the transparent region that are of the CF, the liquid crystal layer, the TFT, and metal routing, and processing is directly skipped by designing a mask. In addition, row-column cabling that could exist and that is interrupted by a region corresponding to the transparent region may be arranged around the region corresponding to the transparent region, and the cabling is separately led out from a left/right side and an upper/lower side, thereby reducing an impact on an area of the transparent region.

In a possible embodiment, in addition to the transparent material layer, there is further an ITO layer on a lower surface of the first LCD glass substrate and on an upper surface of the second LCD glass substrate. An electrical signal is applied to the ITO layer, to produce an electric field for controlling liquid crystal deflection. An ITO layer is still retained in several transparent channels, and is connected to a corresponding electrical signal. For example, an ITO layer in a region corresponding to a transparent channel on the first LCD glass substrate is also connected to an ITO layer in another region, and a same electrical signal is used; and an ITO layer in a region corresponding to a transparent channel on the second LCD glass substrate is connected to an independent control electrical signal, for example, a control electrical signal of one or several pixels in an original region corresponding to the transparent channel may be used. Voltage is applied to the two ITO layers, to produce an electric field for controlling deflection of a liquid crystal material in the transparent channels, so that a large amount of light can pass through the regions corresponding to pin-through-holes, thereby achieving a local transparent effect.

In a possible embodiment, in addition to the transparent material layer, the transparent material further includes a first alignment film and a second alignment film, a liquid crystal is dripped between the first alignment film and the second alignment film to form the liquid crystal layer, and the first alignment film and the second alignment film are used to provide a specific initial deflection to the liquid crystal in a case of no electric field. No alignment film is processed in the local transparent region on the first alignment film and the second alignment film, and a liquid crystal material is dripped into the region. Due to lack of restriction from the first alignment film and the second alignment film, alignments of liquid crystal materials filled in a pin-through-hole are disordered, and the liquid crystal materials are represented as isotropic materials. In this way, a large amount of light can pass through a region corresponding to the pin-through-hole, thereby achieving a local transparent effect.

In a possible embodiment, before the step of combining the several transparent material layers and the several non-transparent material layers, the method further includes: cutting off a transparent material from the first LCD glass substrate and the second LCD glass substrate in the local transparent region, to form the transparent channel in the local transparent region along the stacking direction. After several pin-through-holes are disposed on the first LCD glass substrate and the second LCD glass substrate, there is no need to resolve a problem of air gaps generated between various material layers. In addition, the transparent channels of the first LCD glass substrate and the second LCD glass substrate may be further used to dispose the optical component in a light channel, thereby reducing an overall thickness.

In a possible embodiment, a transparent material is retained in the transparent channel at the several transparent material layers.

Specifically, the transparent material is retained in the transparent region at the several transparent material layers, to form the transparent channel in the transparent region in stack mode. No additional manufacture process is needed, manufacture costs are reduced, and a full screen display effect is not affected. In addition, the transparent material is retained in the local transparent region at the several transparent material layers, so that mechanical strength of the LCD display can be increased, and overall quality of the LCD display can be improved.

In a possible embodiment, before the step of combining the several transparent material layers and the several non-transparent material layers, the method further includes: in an actual manufacturing process of the LCD display, cutting off a transparent material from the CG cover glass in the local transparent region, to form the transparent channel in the local transparent region along the stacking direction. A transparent channel of the CG cover glass is used to provide an acoustic basis for a receiver disposed under the LCD display.

In a possible embodiment, a sealing material is applied to a periphery of the transparent channel of the several non-transparent layers. The sealing material is applied to the periphery of the transparent channel of the several non-transparent layers, so that there is no liquid crystal in a region isolated by using the sealing material. Alternatively, a sealing material or an ink applied to a backside of the CG cover glass may be used to shelter a cabling region.

In a possible embodiment, a length-width ratio of a display dimension of a rectangular display region without a transparent region on the LCD display is 16:9, 18:9, or another standard video format ratio.

In comparison with the prior art, according to the LCD display, the electronic device, and the LCD display manufacturing method provided in the embodiments, local transparency of the LCD display is implemented by using several pin-through-holes at each of the several non-transparent material layers on the LCD display, where the several pin-through-holes are oppositely disposed along the stacking direction, so that light can enter the optical components such as the camera, the ambient light sensor, the optical sensor, and the optical fingerprint sensor that are disposed under the LCD display, and full screen display is implemented in combination with layout optimization of the camera and the receiver. In this way, the screen-to-body ratio of the electronic device is increased.

DESCRIPTION OF EMBODIMENTS

Figure 1:
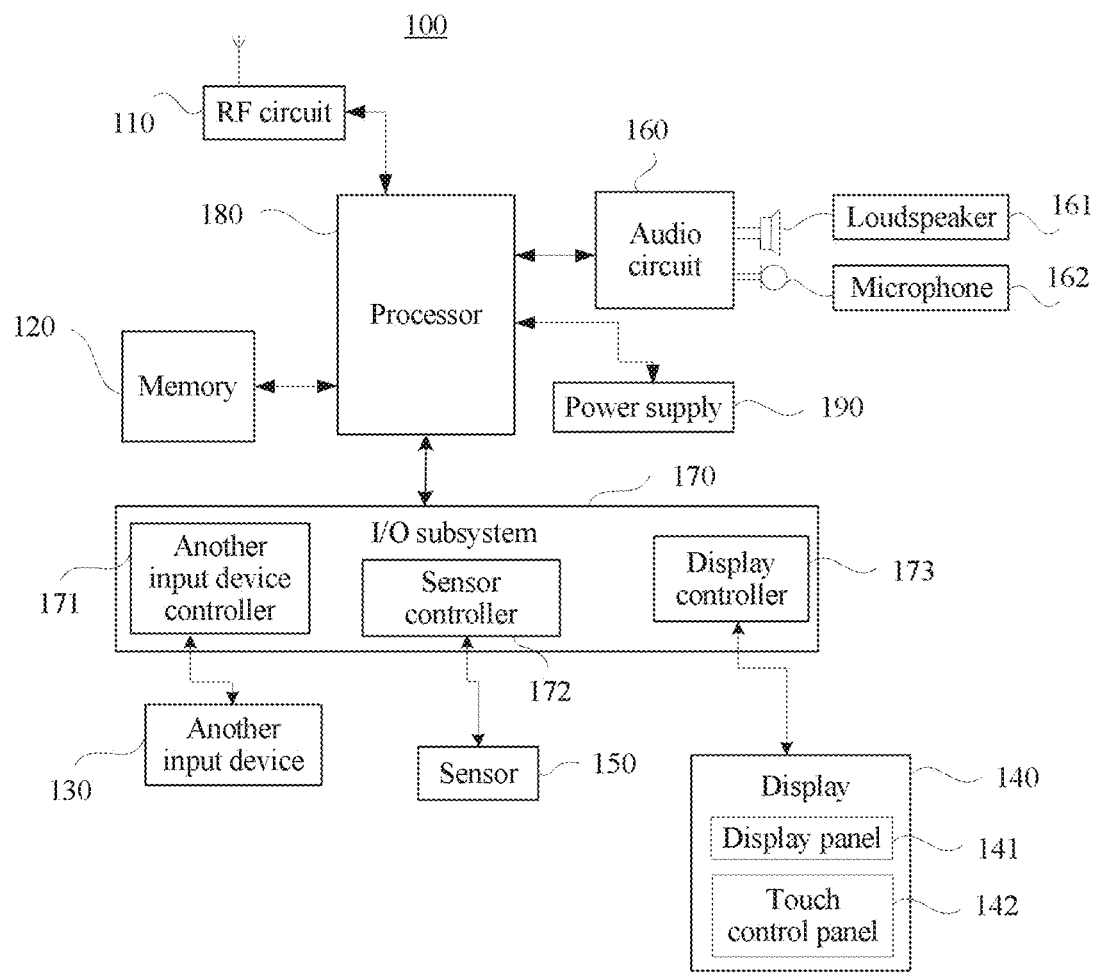
FIG. 1 is a schematic structural diagram of a mobile phone according to an embodiment of the present invention.

An electronic device used in the embodiments of the present invention may be a mobile electronic device such as a mobile phone, a tablet computer, a personal digital assistant (Personal Digital Assistant, PDA), a point of sale (Point of Sales, POS), an in-vehicle computer, a notebook computer, or a smart wearable device (wearable device). The mobile phone is used as an example. FIG. 1 is a schematic structural diagram of a mobile phone related to an embodiment of the present invention. Referring to FIG. 1, a mobile phone 100 includes components such as a radio frequency (Radio Frequency, RF for short) circuit 110, a memory 120, an input unit 130, a display unit 140, a sensor 150, an audio circuit 160, a Wireless Fidelity (Wireless Fidelity, Wi-Fi) module, an I/O subsystem 170, a processor 180, and a power source 190. Persons skilled in the art may understand that the mobile phone structure shown in FIG. 1 is merely an example of an implementation, and does not constitute a limitation on the mobile phone. The mobile phone may include more or fewer components than those shown in the figure, or combine some components, or have different component arrangements.

The following describes all constituent components of the mobile phone 100 in detail with reference to FIG. 1.

The RF circuit 110 may be configured to: receive and send a signal in an information receiving or sending process or a call process, and particularly, receive downlink information from a base station, and then send the downlink information to the processor 180 for processing. In addition, the RF circuit 110 sends related uplink data to the base station. Generally, the RF circuit includes but is not limited to an antenna, at least one amplifier, a transceiver, a coupler, a low noise amplifier (low noise amplifier, LNA), a duplexer, and the like. In addition, the RF circuit 110 may also communicate with a network and another device through wireless communication. The wireless communication may use any communications standard or protocol, including but not limited to Global System for Mobile Communications (global system for mobile communications, GSM), General Packet Radio Service (general packet radio service, GPRS), Code Division Multiple Access (code division multiple access, CDMA), Wideband Code Division Multiple Access (wideband code division multiple access, WCDMA), Long Term Evolution (Long Term Evolution, LTE), an email, a short message service (short messaging service, SMS), and the like.

The memory 120 may be configured to store a software program and a module. The processor 180 executes various function applications of the mobile phone 100 and data processing by running the software program and the module that are stored in the memory 120. The memory 120 may mainly include a program storage area and a data storage area. The program storage area may store an operating system, an application program required by at least one function (such as a voice playback function and an image playback function), and the like. The data storage area may store data (such as audio data and a phonebook) that is created based on use of the mobile phone 100 and the like. In addition, the memory 120 may include a high-speed random access memory, or may further include a non-volatile memory such as at least one disk storage device, a flash memory device, or another volatile solid-state storage device.

The another input device 130 may be configured to receive entered digital or character information, and generate key signal input related to a user setting and function control of the mobile phone 100. Specifically, the another input device 130 may include a touch control panel 142 and other input devices 130. The touch control panel 131, also referred to as a touchscreen, can collect a touch operation (for example, an operation performed by a user on the touch control panel 131 or near the touch control panel 131 by using a finger, a stylus, or any other proper object or accessory) performed by the user on or near the touch control panel 131, and drive a corresponding connection device according to a preset program. Optionally, the touch control panel 171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and then sends the touch point coordinates to the processor 180, and can receive a command sent by the processor 180 and execute the command. In addition, the touch control panel 131 may be implemented in a plurality of types, such as a resistive type, a capacitive type, an infrared type, and a surface acoustic wave type. The input unit 130 may further include the other input devices 132 in addition to the touch control panel 131. Specifically, the other input devices 132 may include but is not limited to at least one of a physical keyboard, a functional button (such as a volume control button or a power button), a trackball, a mouse, a joystick, and the like.

The display 140 may be configured to display information entered by the user, information provided for the user, and various menus of the mobile phone 100. The display 140 may include a display panel 141. Optionally, the display panel 141 may be configured in a form of a liquid crystal display (liquid crystal display, LCD), an organic light-emitting diode (organic light-emitting diode, OLED), or the like. Further, the touch control panel 142 may cover the display panel 141. After detecting a touch operation on or near the touch control panel 131, the touch control panel 142 transfers the touch operation to the processor 180 to determine a type of a touch event. Then the processor 180 provides corresponding visual output on the display panel 141 based on the type of the touch event. In FIG. 1, the touch control panel 142 and the display panel 141 are used as two independent components to implement input and output functions of the mobile phone 100. However, in some embodiments, the touch control panel 142 and the display panel 141 may be integrated to implement the input and output functions of the mobile phone 100.

The mobile phone 100 may further include at least one sensor 150 such as an optical sensor, a motion sensor, and another sensor. Specifically, the optical sensor may include an ambient light sensor and an optical proximity sensor. The ambient light sensor may adjust luminance of the display panel 141 based on brightness of ambient light. The proximity sensor may turn off the display panel 141 and/or backlight when the mobile phone 100 moves to an ear. As one type of a motion sensor, an accelerometer sensor may detect a magnitude of an acceleration in each direction (generally, three axes), and may detect, a magnitude and a direction of gravity when the acceleration sensor is static. The accelerometer sensor may be applied to an application for recognizing a posture (for example, screen switching between a landscape mode and a portrait mode, a related game, or magnetometer posture calibration) of the mobile phone, a vibration recognition-related function (for example, a pedometer and tapping), and the like. For another sensor that may be further configured in the mobile phone 100, such as a gyroscope, a barometer, a hygrometer, a thermometer, or an infrared sensor, details are not described herein.

The audio circuit 160, a loudspeaker 161, and a microphone 162 may provide an audio interface between the user and the mobile phone 100. The audio circuit 160 may transmit, to the speaker 161, an electrical signal that is converted from received audio data, and the speaker 161 converts the electrical signal into a sound signal for output. In addition, the microphone 162 converts a collected sound signal into an electrical signal, and the audio circuit 160 receives the electrical signal, converts the electrical signal into audio data, and outputs the audio data to the processor 180 for processing, to send the audio data to, for example, another mobile phone by using the RF circuit 110, or output the audio data to the memory 120 for further processing.

Wi-Fi is a short-range wireless transmission technology. The mobile phone 100 may assist, by using the Wi-Fi module, the user in receiving/sending e-mails, browsing web pages, accessing streaming media, and the like. The Wi-Fi module provides the user with wireless wideband Internet access, or may be used for short-range communication between two mobile phones. Although FIG. 1 shows the Wi-Fi module, it can be understood that the Wi-Fi module is not a necessary part of the mobile phone 100 and may certainly be omitted as required provided that the essence of the present invention is not changed.

The processor 180 is a control center of the mobile phone 100, connects all parts of the mobile phone by using various interfaces and lines, and performs various functions and data processing of the mobile phone 100 by running or executing the software program and/or the module stored in the memory 120 and invoking data stored in the memory 120, to perform overall monitoring on the mobile phone. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It can be understood that the modem processor may not be integrated into the processor 180.

The mobile phone 100 further includes a power supply 190 (for example, a battery) supplying power to the components. Preferably, the power supply may be logically connected to the processor 180 by using a power management system, to implement functions such as charging and discharging management and power consumption management by using the power management system.

Although not shown, the mobile phone 100 may further include a camera, a Bluetooth module, and the like. Details are not described herein.

In this embodiment of the present invention, the mobile phone 100 includes at least one short-range wireless communications module such as a Wi-Fi module, a Bluetooth module, or an NFC module.

In this embodiment of the present invention, the processor included in the system has the following functions: when it is detected that a file displayed on the touchscreen is touched, determining whether a touching attribute meets a preset condition, where the touching attribute includes at least one of a file touching time, a file dragging trace, and a final location to which the file is dragged; and when the touching attribute meets the preset condition, transmitting the file to a target electronic device by using an established short-range wireless communications data channel.

Figure 2:
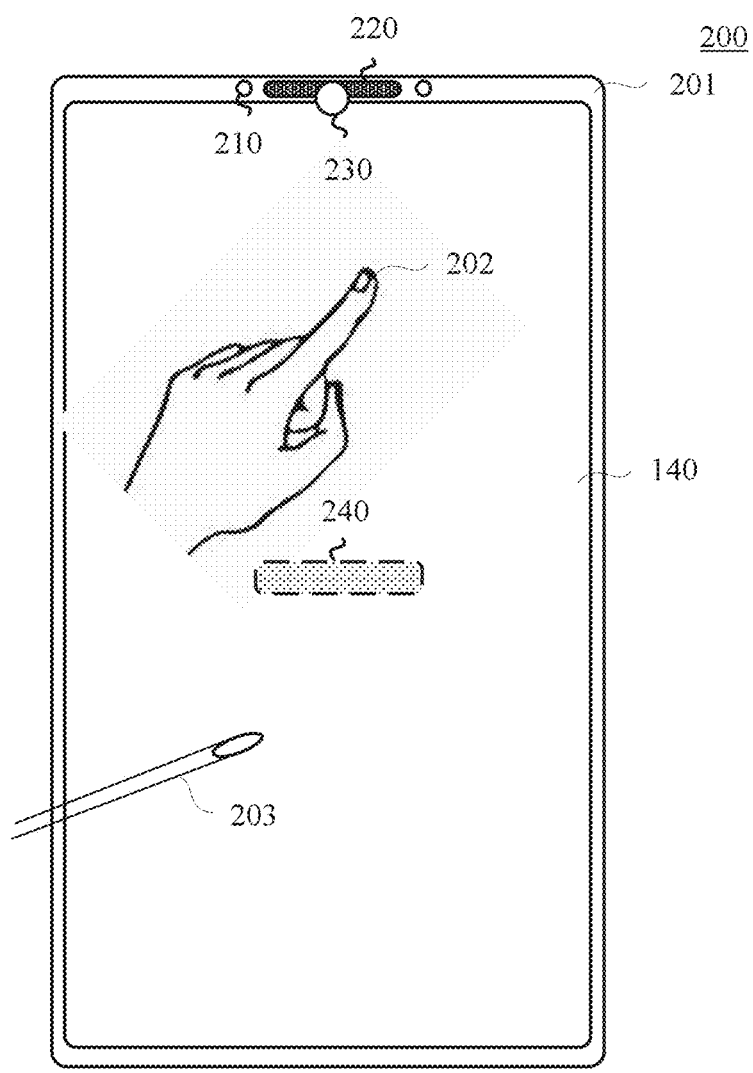
FIG. 2 is a schematic structural diagram of another mobile phone according to an embodiment of the present invention.

FIG. 2 shows an embodiment of another mobile phone according to an embodiment of the present invention. Referring to FIG. 2, the mobile phone 200 includes a body 201 and a display 140. The display 140 may be implemented by integrating a touch control panel and a display panel to implement input and output functions of the mobile phone 200. A user may perform tap and slide operations on the display 140 by using a finger 202 or a stylus 203, and the touch control panel may detect the operations. The display 140 may also be referred to as a screen. The body 201 includes a photosensitive element 210, a receiver 220, a camera 230, a physical button 240, a power button 250, a volume button 260, and the like. The photosensitive element 210 may include an optical proximity sensor and an ambient light sensor. The photosensitive element 210 is mainly configured to detect a distance between a human body and the mobile phone. For example, when a user is being on a call, and the mobile phone is close to an ear, after the photosensitive element 210 detects distance information, the touchscreen 140 of the mobile phone 200 may disable an input function to prevent accidental touch.

It should be noted that the mobile phone 200 shown in FIG. 2 is merely an example, and does not constitute a limitation. The mobile phone 200 may include more or fewer components than those shown in the figure, or combine some components, or have different component arrangements.

To increase a screen-to-body ratio, it is considered to move some or all of the camera, the optical proximity sensor, the ambient light sensor, the receiver, and a front-facing fingerprint sensor from a non-display region on the display panel 141 to a lower side of a display region, and change a cabling, a driving chip, and a cutting process of the display 140, to effectively use the display panel 141 of the mobile phone, reduce the non-display region of the display panel 141, thereby increase the screen-to-body ratio. In addition, a solution that the camera, the optical proximity sensor, and/or the ambient light sensor are/is configured as a pop-up optical module increases complexity of a structural design of an electronic device. Consequently, product reliability is reduced, and even a thickness of the entire electronic device is increased. In addition, it is considered to use an LCD display during designing of the electronic device, to resolve problems of a cost increase and lack of waterproof and dustproof functions due to a hole if an organic light-emitting diode (organic light-emitting diode, OLED) display is used.

In this embodiment of the present invention, all or some of the camera, the optical proximity sensor, the ambient light sensor, the receiver, and the front-facing fingerprint sensor are disposed in the display region on the display panel 141 of the LCD display. In FIG. 2, that the photosensitive element 210 and the receiver 220 are disposed in the non-display region of the display 140 and a part of the camera 230 is disposed in the non-display region of the display 140 is used as an embodiment. The photosensitive element 210 includes the optical proximity sensor, a photosensitive sensor, an infrared detector, a laser detector, and the like. The camera 230 includes a front-facing camera and a rear-facing camera. The physical button 240 is usually a home button, or a home button integrated with a fingerprint recognition module. The physical button 240 may further include a back button, a menu button, and an exit button. Alternatively, the physical button 240 may be a touch button in a specified position on the touchscreen. For example, the physical button 240 is a touch button in a center of the touchscreen, and the touch button is integrated with a fingerprint recognition module. For details of the receiver 220, refer to descriptions of the loudspeaker 161 in the embodiment shown in FIG. 1. For details of the physical button 240, the power button 250, and the volume button 260, refer to descriptions of the another input device 130 in the embodiment shown in FIG. 1. It should be noted that in this embodiment of this application, the mobile phone may further include a microphone, a data interface, a subscriber identity module (subscriber identification module, SIM) card interface (not shown in the figure), a headset jack, and the like.

It should be noted that in this embodiment of the present invention, for appearances of the photosensitive component 210, the receiver 220, the camera 230, and the physical button 240 on the mobile phone 200, the appearances of the photosensitive component 210, the receiver 220, the camera 230, and the physical button 240 on the mobile phone 200 may be collectively referred to as a transparent region. The transparent region is used to transmit light to the photosensitive component 210 and the camera 230, and transmit voice to the receiver 220.

According to the LCD display provided in this embodiment of the present invention, a structure of the LCD display is designed to implement a local transparent region, so that outside light can enter components such as the front-facing camera and the ambient light sensor that are disposed under the display, and a full screen display effect is achieved in combination with layout optimization of components such as the camera and the receiver. Therefore, the LCD display provided in this embodiment of the present invention can be applied to all scenarios in which local transparency of the LCD display needs to be implemented. The LCD display provided in this embodiment of the present invention and a solution in which a pop-up structure and the OLED display are used can implement full screen display of a mobile electronic device with low costs, and improve user experience.

Figure 3:
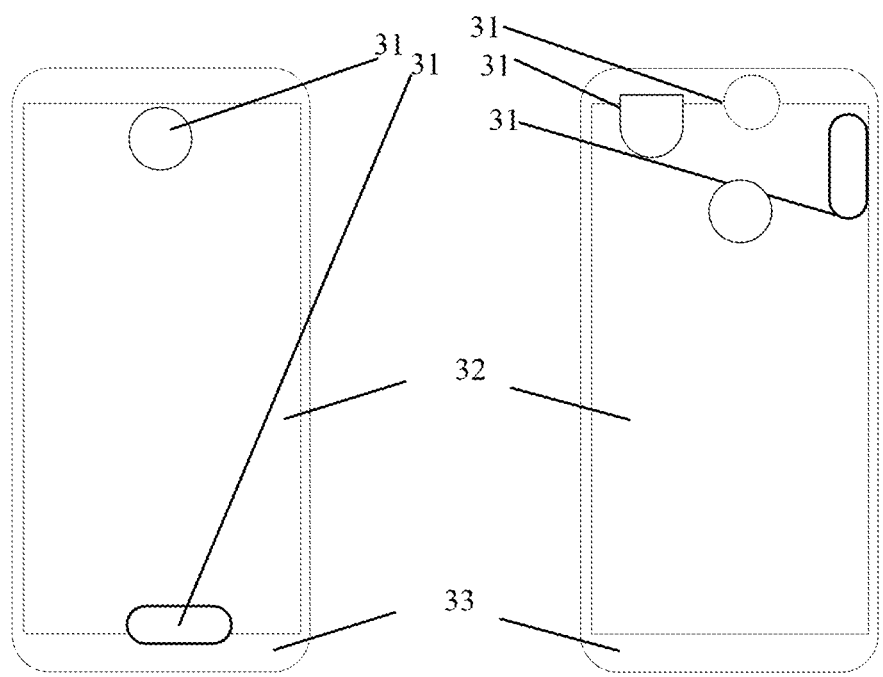
FIG. 3 is a schematic diagram of a mobile phone interface according to an embodiment of the present invention.

FIG. 3 is a schematic diagram of a mobile phone interface according to an embodiment of the present invention. As shown in FIG. 3, use sides (a front and/or a back) of the mobile phone may include a display region 32 and a non-display region 33. The display region includes a local transparent region 31.

The display region 32 may be the display 140 in FIG. 2. The non-display region 33 may be a non-display region of the display 140 of an interface appearance on an upper surface of the mobile phone 200 in FIG. 2. The local transparent region 31 may be the photosensitive element 210 and the camera 230 in FIG. 2. In FIG. 3, that the local transparent region 31 is completely disposed at an upper left corner of the display region 32, is completely disposed in a center of the display region 32, is partially disposed in a center of a lower surface of the display region 32, or partially disposed in a center of an upper surface of the display region 32 is used as an example. With reference to a design of a mobile phone user interface, all or some of a photosensitive component 11, a receiver 12, and a camera 13 may be disposed at the upper left corner of the display region 32 or disposed in any position in the display region 32, and the position is not limited to the center of the upper surface. A physical button 14 may be completely disposed in the center of the display region 32, or completely or partially disposed in any position on the lower surface of the display region 32, and the position is not limited to the center of the lower surface.

It should be noted that the photosensitive component 210, the receiver 220, the camera 230, and the physical button 240 have different structures inside the mobile phone, and therefore shapes presented on a surface of the mobile phone are also different. In other words, shapes in the transparent region 31 may be different. For example, appearances of the photosensitive component 210, the camera 230, and the physical button 240 may be in circular shapes on the surface of the mobile phone, and the receiver 220 and the physical button 240 may be in curved rectangular shapes.

Figure 4:
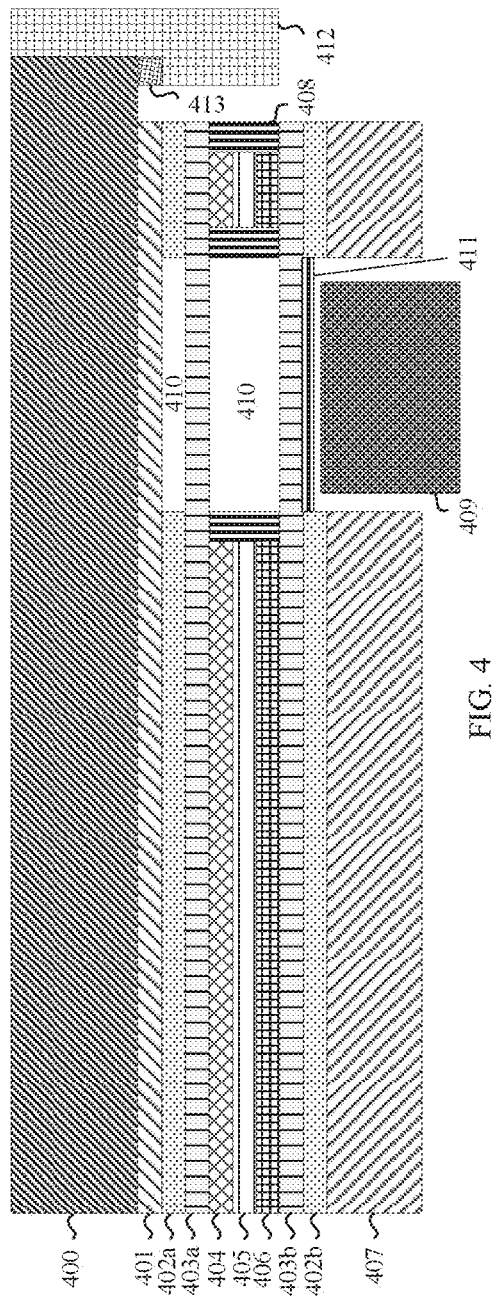
FIG. 4 to FIG. 17 are schematic structural diagrams of an LCD display according to an embodiment of the present invention.

FIG. 4 is a schematic structural diagram of an LCD display according to an embodiment of the present invention. As shown in FIG. 4, the LCD display may be disposed in an electronic device, and the LCD display and a component body 409 of an optical component may be disposed together.

The LCD display includes several transparent material layers and several non-transparent material layers that are disposed in stack mode. There is a local transparent region on the LCD display. No non-transparent material is applied to each non-transparent material layer in the local transparent region, to form a transparent channel in the local transparent region along a stacking direction. The component body 409 of the optical component may be completely or partially disposed in the transparent channel of the LCD display.

That no non-transparent material is processed in the local transparent region at each non-transparent material layer may be as follows: In a manufacturing process, for each non-transparent material, no non-transparent material is processed in a position of a preset local transparent region or a non-transparent material of the preset local transparent region is removed from the entire transparent material layers, so that there is no non-transparent material in the local transparent region at the non-transparent material layer.

It should be noted that both the local transparent region and a transparent region may be defined as a region, on the LCD display, that is used to transmit light to the optical component. For brevity, the local transparent region and the transparent region have a same meaning and are interchangeably used.

In this embodiment of the present invention, the transparent region may be presented as a pin-through-hole or a gap on the LCD display. A material of the pin-through-hole or the gap on the LCD display may be implemented by skipping processing or by using a cutting process, for example, a pin-through-hole 410 in FIG. 4 to FIG. 16 and a gap 1310 in FIG. 13. Pin-through-holes or gaps are oppositely disposed along the stacking direction, to form the transparent channel on the LCD display. The component body 409 of the optical component may be completely or partially disposed in the transparent channel of the LCD display. The pin-through-hole and the gap are two different presentation manners of the transparent region. For brevity, the pin-through-hole is used for description.

In some embodiments, the LCD display may include several transparent material layers and several non-transparent material layers that are disposed in stack mode. Several pin-through-holes 410 may be disposed in each non-transparent material, and the several pin-through-holes 410 are oppositely disposed along the stacking direction, to form a transparent channel on the LCD display. Correspondingly, the component body 409 of the optical component is completely or partially disposed in the transparent channel on the LCD display.

It should be noted that a quantity of pin-through-holes disposed on the non-transparent material is related to a quantity of component bodies 409 of optical components. A plurality of pin-through-holes need to be disposed if there are component bodies 409 of a plurality of optical components. In other words, the quantity of component bodies 409 of optical components is corresponding to the quantity of component channels. For ease of description, the following performs description by using an example in which one pin-through-hole is disposed at a non-transparent material layer and a component body 409 of one optical component is disposed in the pin-through-hole.

In a possible embodiment, the non-transparent material layer is a material layer whose transmittance is less than a transmittance threshold. The transmittance threshold may be 40%, 50%, 60%, 80%, or the like. The transmittance threshold may be set based on a specific optical sensing requirement of an optical component. For example, a camera has a relatively high requirement for light transmission, and the transmittance threshold may be set to 40% to 45%. Therefore, the local transparent region or the transparent region described in this specification may be also a region whose transmittance meets a preset transmittance threshold.

In this embodiment of the present invention, the non-transparent material layer includes a first polarizer 402a, a color film (Color Filter, CF) 404, a liquid crystal layer 405, a thin film transistor (Thin film transistor, TFT) 406, a second polarizer 402b, and a backlight module 407. The transparent material layer includes a CG cover glass 400, a first LCD glass substrate 403a, and a second LCD glass substrate 403b. The first polarizer 402a, the first LCD glass substrate 403a, the CF 404, the liquid crystal layer 405, the TFT 406, the second LCD glass substrate 403b, the second polarizer 402b, and the backlight module 407 are sequentially stacked on a lower surface of the CG cover glass 400. The lower surface of the CG cover glass 400 is defined based on the stacking direction of the LCD display when the LCD display of the mobile phone towards upward. Alternatively, the lower surface of the CG cover glass 400 may be defined specific to a case in which the LCD display of the mobile phone towards downward. This is not limited in this embodiment of the present invention. FIG. 4 is a schematic structural diagram of an example of an LCD display. A stacking order of the LCD display may be adjusted based on an actual design, and the LCD display may include more structures for implementing display. For brevity, details are not described herein.

A pin-through-hole 410 is disposed on the first polarizer 402a, a pin-through-hole 410 is disposed on the CF 404, the liquid crystal layer 405, and the TFT 406, and a pin-through-hole 410 is disposed on the second polarizer 402b and the backlight module 407. A position of the pin-through-hole 410 disposed at the first polarizer 402a is separately corresponding to a position of the pin-through-hole 410 disposed at the CF 404, the liquid crystal layer 405, and the TFT 406 and a position of the pin-through-hole 410 disposed at the second polarizer 402b and the backlight module 407.

Specifically, the pin-through-hole 410 is disposed at the first polarizer 402a, the pin-through-hole 410 is disposed at the CF 404, the liquid crystal layer 405, and the TFT 406, and the pin-through-hole 410 is disposed at the second polarizer 402b and the backlight module 407, to dispose the transparent region on a mobile phone interface. During actual manufacturing of the LCD display, a position of the transparent region on the LCD display is first determined based on a design requirement of the entire mobile phone. The transparent region is used to transmit light to the photosensitive component 210 and the camera 230 in FIG. 2, and transmit voice to the receiver 220.

Figure 19:
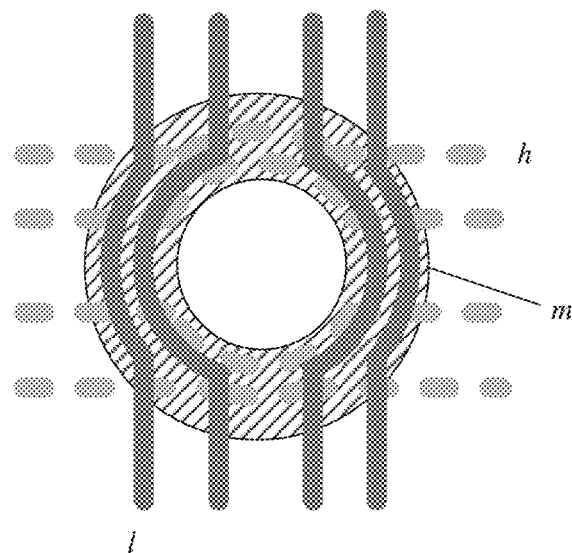
FIG. 19 is a schematic structural diagram of metal cabling according to an embodiment of the present invention.

Specifically, a local region that needs to be transparent on the LCD display is determined based on the design requirement of the entire machine. Regions corresponding to the first polarizer 402a and the second polarizer 402b on the LCD display are removed. The regions may be removed before or after the first polarizer 402a and the second polarizer 402b are respectively formed on the first LCD glass substrate 403a and the second LCD glass substrate 403b. According to the designed transparent region, during manufacturing of the LCD crystal display, a non-transparent material layer such as the CF 404, the liquid crystal layer 405, the TFT 406, and metal cabling corresponding to the transparent region is not processed. A manufacturing method may be as follows: During processing of these materials, the region is directly not processed by designing a mask. Row-column cabling that could exist and that is interrupted by the region may be arranged around the region, and therefore, a non-transparent region with a specific width is formed. Alternatively, the row-column cabling that is interrupted may be independently arranged, and the cabling is separately led out from a nearby left/right side or upper/lower side, to reduce an impact on an area of the transparent region, as shown in FIG. 19. A sealing material such as a sealing adhesive or another sealing material is processed on a periphery of the transparent region between the first LCD glass substrate 403a and the second LCD glass substrate 403b, so that there is no liquid crystal in the region isolated by using the sealing material, and a large amount of light can pass through the LCD display. In addition, a sealing material or an ink applied to a backside of the cover glass may be used to shelter a cabling region. Because the backlight module 407 is non-transparent, a part corresponding to the transparent region needs to be hollowed out during designing of the backlight module 407, and a component body of an optical component such as a camera may be partially extended into a hollow-out part based on a thickness of the hollow-out part, to reduce a thickness of the entire machine. Because light is partially reflected on screens for which a difference between refractive indexes is relatively large, a transmittance is reduced. For example, air gaps generated after the foregoing materials on the LCD are removed cause a transmittance reduction. A material such as an OCA whose refractive index is close to those of the first LCD glass substrate 403*a* and the second LCD glass substrate 403*b* may fill the air gaps. The OCA may be a solid adhesive or a liquid adhesive. The solid OCA may be formed, in a bonding manner, on a lower surface of the first LCD glass substrate 403*a* and on an upper surface of the second LCD glass substrate 403*b* that are corresponding to the transparent region, to increase an overall light transmittance. Alternatively, an inner side of the lower LCD glass substrate may be coated with an AR antireflective film 411, to further increase the transmittance and provide a good optical basis for the optical component such as the camera 230. An air gap between the CG cover glass 400 and the first LCD glass substrate 403*a* may be filled with an original OCA 402, and another layer of the OCA may be further used or a liquid OCA may be used to fill the gap.

In a possible embodiment, no non-transparent material is processed in the transparent region at each non-transparent material layer, and the transparent region at the non-transparent material layer is filled with a transparent filler or a liquid crystal material.

Figure 6:
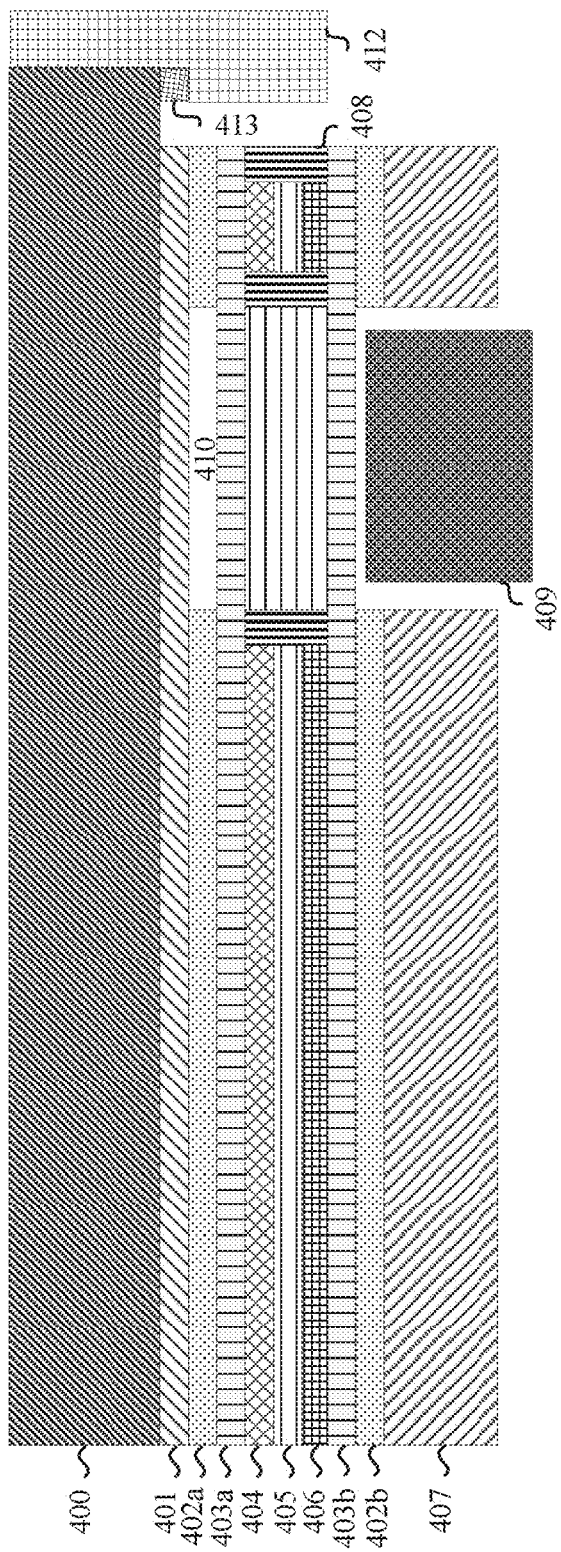

Specifically, the liquid crystal material or the transparent filler fills a region corresponding to the transparent region between the first LCD glass substrate 403*a* and the second LCD glass substrate 403*b*. To be specific, the pin-through-hole 410 disposed at the CF 404, the liquid crystal layer 405, and the TFT 406 is filled with the liquid crystal material or the transparent filler. In FIG. 6, that the pin-through-hole 410 disposed at the CF 404, the liquid crystal layer 405, and the TFT 406 is filled with the liquid crystal material is used as an example. Specifically, because light is partially reflected on screens for which a difference between refractive indexes is relatively large, a transmittance is reduced. For example, an air gap generated after the pin-through-hole 410 is disposed at the CF 404, the liquid crystal layer 405, and the TFT 406 causes a transmittance reduction. To resolve a problem of the air gap, the pin-through-hole 410 disposed at the CF 404, the liquid crystal layer 405, and the TFT 406 may be filled with a liquid crystal without adding a device or a process of another filling material. If no liquid crystal material or transparent filler is dripped into the region corresponding to the transparent region, no additional production process is required, and light transmission is not affected.

Figure 7:
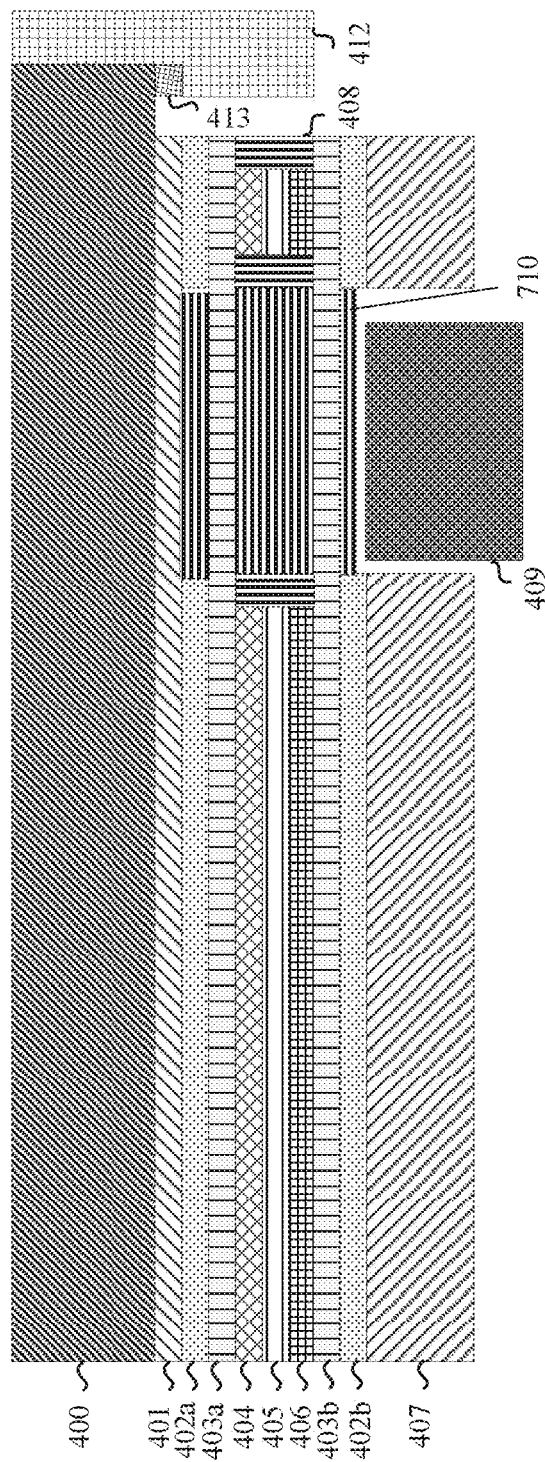

The pin-through-hole 410 disposed at the CF 404, the liquid crystal layer 405, and the TFT 406 may be further filled with a transparent material such as a transparent material 710 in FIG. 7. A refractive index of the transparent material 710 may be close to refractive indexes of the first LCD glass substrate 403*a* and the second LCD glass substrate 403*b*. For example, the pin-through-hole 410 disposed at the first polarizer 402*a* and the pin-through-hole 410 disposed at the CF 404, the liquid crystal layer 405, and the TFT 406 may be filled with an OCA, and an OCA is formed on a lower surface of the second LCD glass substrate. Different processes may be used based on different material forms of the OCA. For example, a bonding manner may be used for a solid OCA, and the pin-through-hole 410 disposed at the CF 404, the liquid crystal layer 405, and the TFT 406 is filled with the OCA, to increase an overall light transmittance. For example, in FIG. 10, the transparent material 610 may fill the pin-through-hole 410 disposed at the first polarizer 402*a*, and the liquid crystal material fills the pin-through-hole 410 disposed at the CF 404, the liquid crystal layer 405, and the TFT 406, and the OCA is formed on the lower surface of the second LCD glass substrate.

Figure 8:
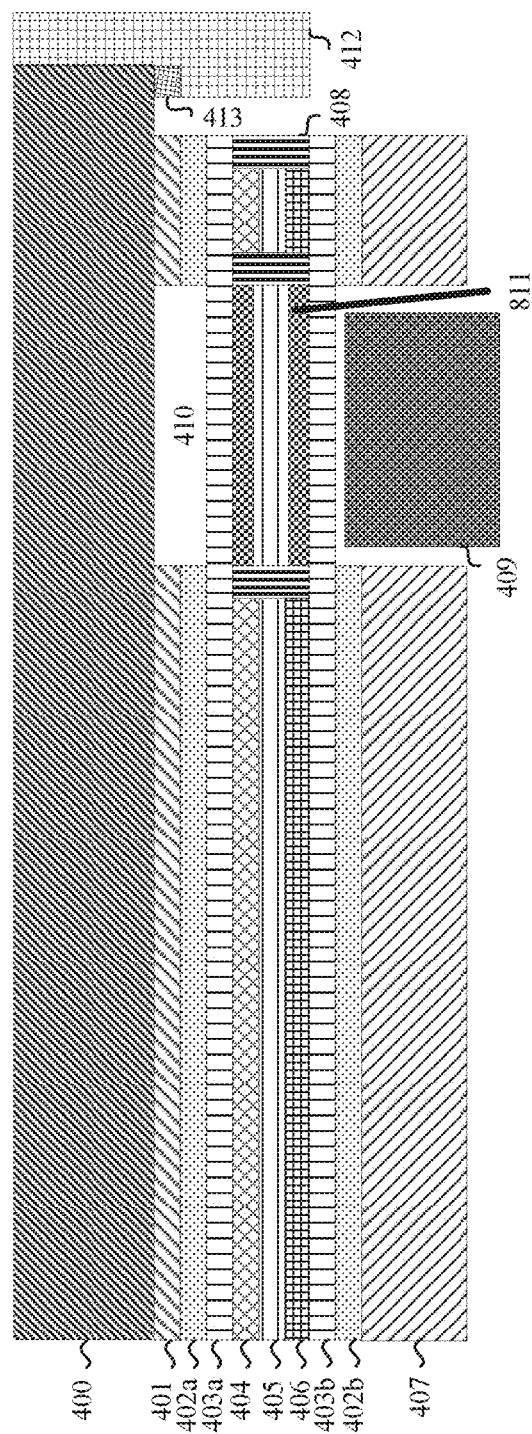

It should be noted that the pin-through-hole 410 disposed at the CF 404, the liquid crystal layer 405, and the TFT 406 is filled with the liquid crystal material. However, the filled liquid crystal material has a very low transmittance. Therefore, in an actual manufacturing process, an ITO material is processed on the lower surface of the first LCD glass substrate 403*a* corresponding to the transparent region, and an ITO material is retained on the upper surface of the second LCD glass substrate 403*b*. As shown in FIG. 8, an ITO material 811 is formed on the upper surface and the lower surface filled with the liquid crystal material. After the ITO material is powered on, performance of the filled liquid crystal material changes, so that light can be transmitted and light transmission is enhanced.

Specifically, in addition to the transparent material layer, there is further an ITO layer on the lower surface of the first LCD glass substrate 403*a* and on the upper surface of the second LCD glass substrate 403*b*. An electrical signal is applied to the ITO layer, to produce an electric field for controlling liquid crystal deflection. An ITO layer is still retained in several pin-through-holes 410, and is connected to a corresponding electrical signal. For example, an ITO layer in a region corresponding to a pin-through-hole 410 on the first LCD glass substrate 403*a* is also connected to an ITO layer in another region, and a same electrical signal is used; and an ITO layer in a region corresponding to a pin-through-hole 410 on the second LCD glass substrate 403*b* is connected to an independent control electrical signal, for example, a control electrical signal of one or several pixels in an original region corresponding to the transparent channel may be used. Voltage is applied to the two ITO layers, to produce an electric field for controlling deflection of a liquid crystal material in the pin-through-holes 410, so that a large amount of light can pass through the regions corresponding to the pin-through-holes, thereby achieving a local transparent effect.

In a possible embodiment, the transparent material further includes a first alignment film and a second alignment film. The first alignment film is manufactured on an upper surface of the liquid crystal layer 405, and the second alignment film is manufactured on a lower surface of the liquid crystal layer 405. For example, in FIG. 9, that a first alignment film 911*a* is manufactured on the upper surface of the liquid crystal layer 405 and a second alignment film 911*b* is manufactured on the lower surface of the liquid crystal layer 405 is used as an example.

Figure 9:
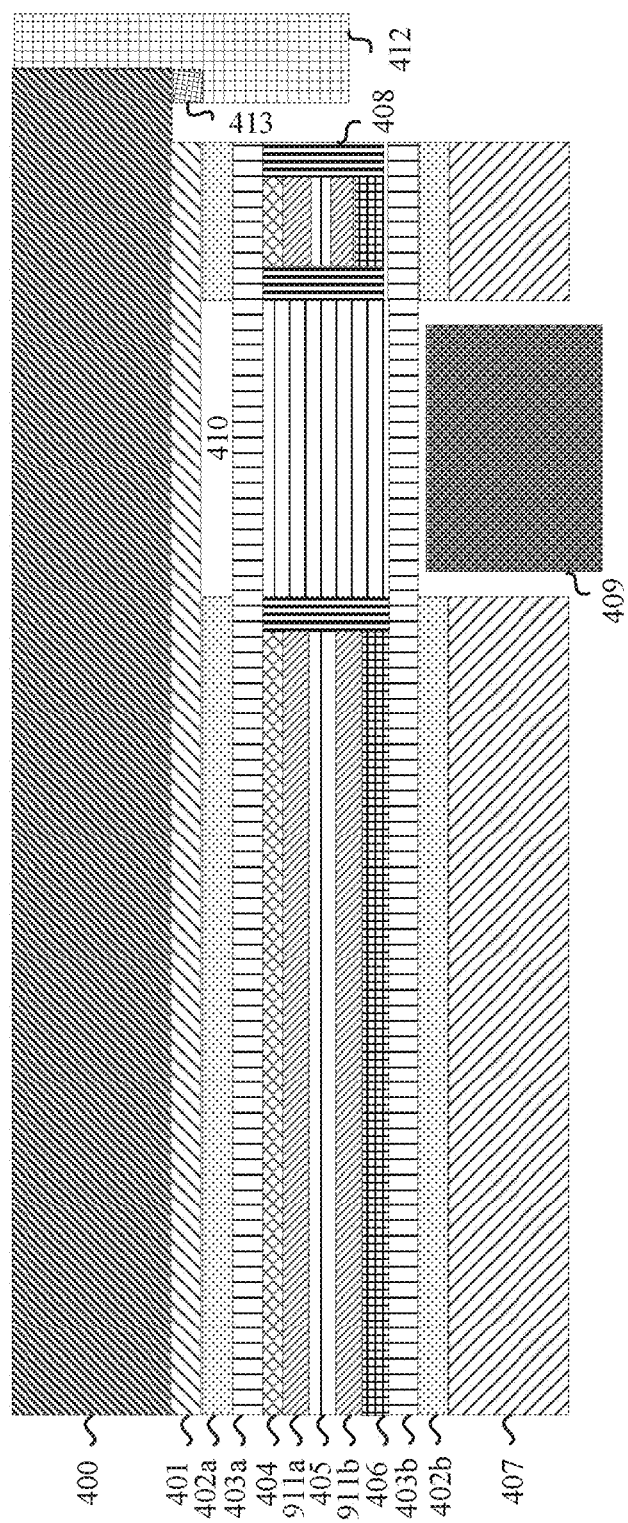

Specifically, in FIG. 9, the liquid crystal layer 405 is formed between a lower surface of the first alignment film 911*a* and an upper surface of the second alignment film 911*b*. No first alignment film or second alignment film may be processed in a region of the pin-through-hole 410, and the pin-through-hole 410 corresponding to the CF 404, the liquid crystal layer 405, and the TFT 406 is filled with the liquid crystal material. For example, due to lack of the first alignment film 911*a* and the second alignment film 911*b* in the region, alignments in the liquid crystal layer 405 are disordered, and liquid crystal materials in the liquid crystal layer 405 are represented as isotropic materials, so that a large amount of light can normally pass through the region, thereby achieving a local transparent effect.

In a possible embodiment, the first alignment film and the second alignment film may be processed in a region of the pin-through-hole 410. For example, in FIG. 10, when light needs to be transmitted, the first alignment film 911*a* and the second alignment film 911*b* in the pin-through-hole 410 are powered on, so that the first alignment film 911*a* and the second alignment film 911*b* in the pin-through-hole 410 are invalid, alignments in the liquid crystal layer 405 are disordered, and liquid crystal materials in the liquid crystal layer 405 are represented as isotropic materials. In this way, a large amount of light can normally pass through the region, thereby achieving a local transparent effect.

In a possible embodiment, the first alignment film and the second alignment film may be processed only in a region of the pin-through-hole 410. When light needs to be transmitted, the first alignment film and the second alignment film that are processed in the region of the pin-through-hole 410 are powered on, so that the first alignment film and the second alignment film in the pin-through-hole 410 are invalid, alignments in the liquid crystal layer 405 are disordered, and liquid crystal materials in the liquid crystal layer 405 are represented as isotropic materials. In this way, a large amount of light can normally pass through the region, thereby achieving a local transparent effect.

Figure 15:
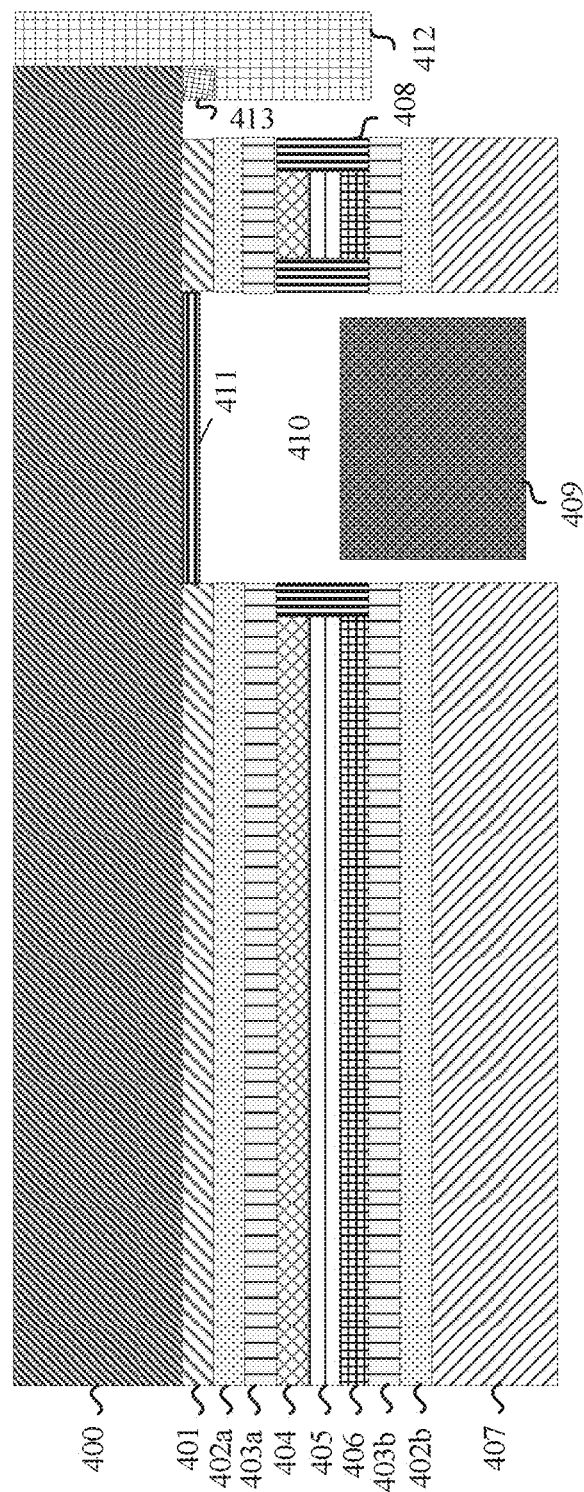

In a possible embodiment, as shown in FIG. 15, an AR antireflective film 411 may be further processed on the lower surface of the CG cover glass 400 corresponding to the pin-through-hole 410. As shown in FIG. 4, the lower surface of the second LCD glass substrate 403*b* corresponding to the pin-through-hole 410 is coated with the AR antireflective film 411. A quantity of AR antireflective films 411 is related to a requirement of the LCD display for a transmittance. The quantity of AR antireflective films 411 may be correspondingly increased according to a specific case, to improve a transmittance and provide a good optical basis for an optical component such as a camera. No OCA is formed at the AR antireflective film 411, to prevent optical interference to the optical component.

In a possible embodiment, no transparent material is processed in the transparent region on the first LCD glass substrate 403*a* and the second LCD glass substrate 403*b*, to form a transparent channel in the transparent region along the stacking direction.

Specifically, several pin-through-holes are separately disposed on the first LCD glass substrate 403*a* and the second LCD glass substrate 403*b*. Regions of the pin-through-holes disposed on the first LCD glass substrate 403*a* and the second LCD glass substrate 403*b* are corresponding to the pin-through-hole 410. For example, in FIG. 12, that two pin-through-holes 1210 are separately disposed on the first LCD glass substrate 403*a* and the second LCD glass substrate 403*b* is used as an example. The two pin-through-holes 1210 are disposed on each of the first LCD glass substrate 403*a* and the second LCD glass substrate 403*b*, so that a thickness of the display in the transparent region can be further used by another component, and an overall thickness can be reduced.

In a possible embodiment, a transparent material is retained in the transparent channel at the several transparent material layers.

Specifically, the transparent material is retained in the transparent channel at the several transparent material layers, to form the transparent channel in the transparent region in stack mode. No additional manufacture process is needed, manufacture costs are reduced, and a full screen display effect is not affected. In addition, the transparent material is retained in the transparent region at the several transparent material layers, so that mechanical strength of the LCD display can be increased, and overall quality of the LCD display can be improved.

It should be noted that the transparent channel is formed in stack mode when no non-transparent material is processed in the transparent region at the several non-transparent material layers.

In a possible embodiment, no transparent material is processed in the transparent region on the CG cover glass, to form the transparent channel in the transparent region along the stacking direction.

Specifically, several pin-through-holes may be further disposed on the CG cover glass 400. Regions of the pin-through-holes disposed on the CG cover glass 400 are corresponding to a position of the pin-through-hole 410. For example, in FIG. 13, that two pin-through-holes 1210 are disposed on the CG cover glass 400 is used as an example. Two pin-through-holes 1310 are disposed on the CG cover glass 400, to provide a good acoustic basis for an acoustic component such as a receiver.

Figure 13:
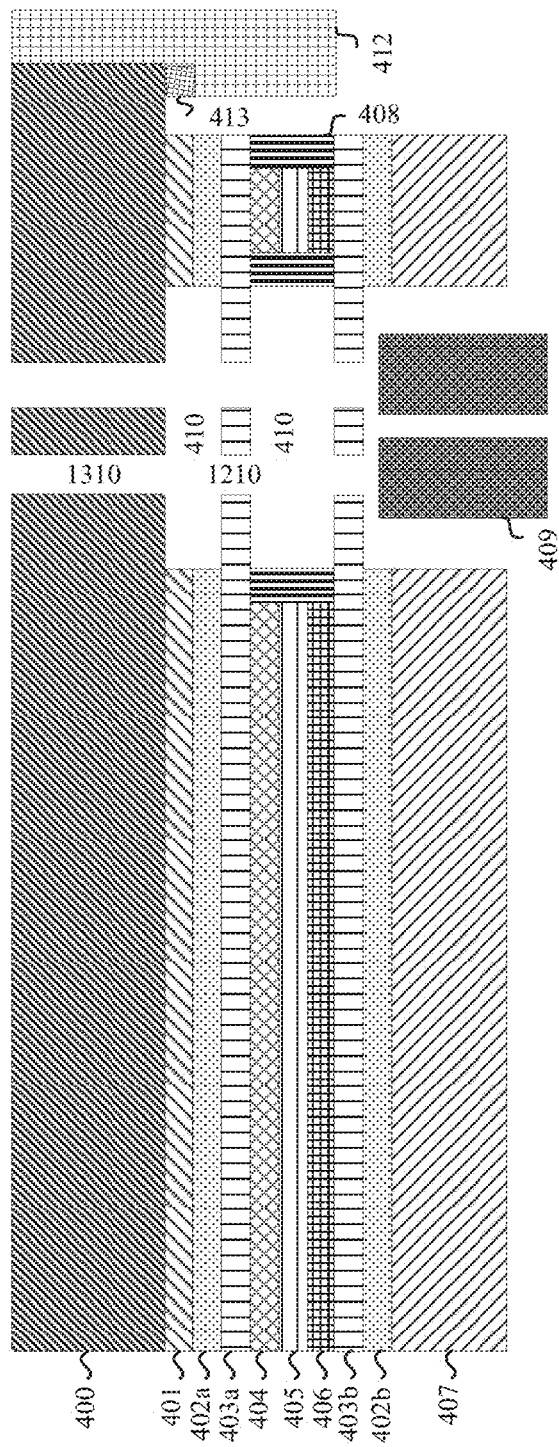

It should be noted that in FIG. 13, to provide a good acoustic basis for the acoustic component such as the receiver, the two pin-through-holes 1210 disposed on each of the first LCD glass substrate 403*a* and the second LCD glass substrate 403*b* are corresponding to the two pin-through-holes 1310 disposed on the CG cover glass 400. A good acoustic basis is provided for the acoustic component such as the receiver 220 by using the disposed pin-through-hole 410, the pin-through-holes 1210, and the pin-through-holes 1310.

In a possible embodiment, a sealing material is applied to a periphery of the pin-through-hole 410.

Specifically, the sealing material such as a silicone sealant is applied to the periphery of the pin-through-hole 410, so that there is no liquid crystal in a region isolated by using the sealing material. For example, in FIG. 4, that a sealing material is applied to a periphery of the pin-through-hole 410 disposed at the CF 404, the liquid crystal layer 405, and the TFT 406 is used as an example.

It should be noted that no sealing material may be applied to a periphery of the pin-through-hole 410 disposed at the CF 404 and a periphery of the pin-through-hole 410 disposed at the TFT 406, provided that a liquid crystal is used for isolation.

In a possible embodiment, a length-width ratio of a display dimension of a rectangular display region without a transparent channel in a display region is 16:9 or 18:9.

Specifically, in FIG. 18 (*d*), for a screen under the transparent region, namely, a screen excluding the transparent region, a length of the screen is H, and a width of the screen is W. The H/W ratio of the screen may be 18:9, 16:9, or 4:3, or another movie/video-supported standard-format ratio, so that experience in watching a film or a video, viewing an image, or the like is not affected by the transparent region.

In a possible embodiment, the transparent region may be completely or partially disposed in the display region on the CG cover glass 400.

Specifically, the camera 20 may be completely or partially disposed in the display region on the CG cover glass 400. For example, the camera 20 is completely disposed in the display region in FIG. 18 (*a*), (*b*), (*d*), (*e*), and (*f*), and the camera 20 is partially disposed in the display region in FIG. 18 (c). The transparent region may be disposed in different positions in the display region. For example, in FIG. 18 (b) and FIG. 18 (d), the cameras 20 are disposed in different positions of the display region. The transparent region may be set to different shapes. For example, in FIG. 18 (f), the camera 20 and the photosensitive component 21 may be disposed in a same transparent region 27. In FIG. 18 (e), there are two cameras 20. Same as the camera 20, the photosensitive component 21 may be partially or completely disposed in the display region, and a size and a position of a transparent region corresponding to the photosensitive component 21 may vary with the photosensitive component. The receiver may be partially or completely disposed in the display region. The physical button 24 may also be partially or completely disposed in the display region. The physical button 24 may alternatively be a touch button at a specified position in the display region. For example, the physical button 24 is a touch button in a central position in the display region, and the touch button is integrated with a fingerprint recognition module, for example, a physical button 25 shown in FIG. 18 (b), FIG. 18 (c), FIG. 18 (d), and FIG. 18 (e).

The following describes a position, a size, and a shape of the transparent region disposed in the display region with reference to FIG. 4 to FIG. 17.

Figure 14:
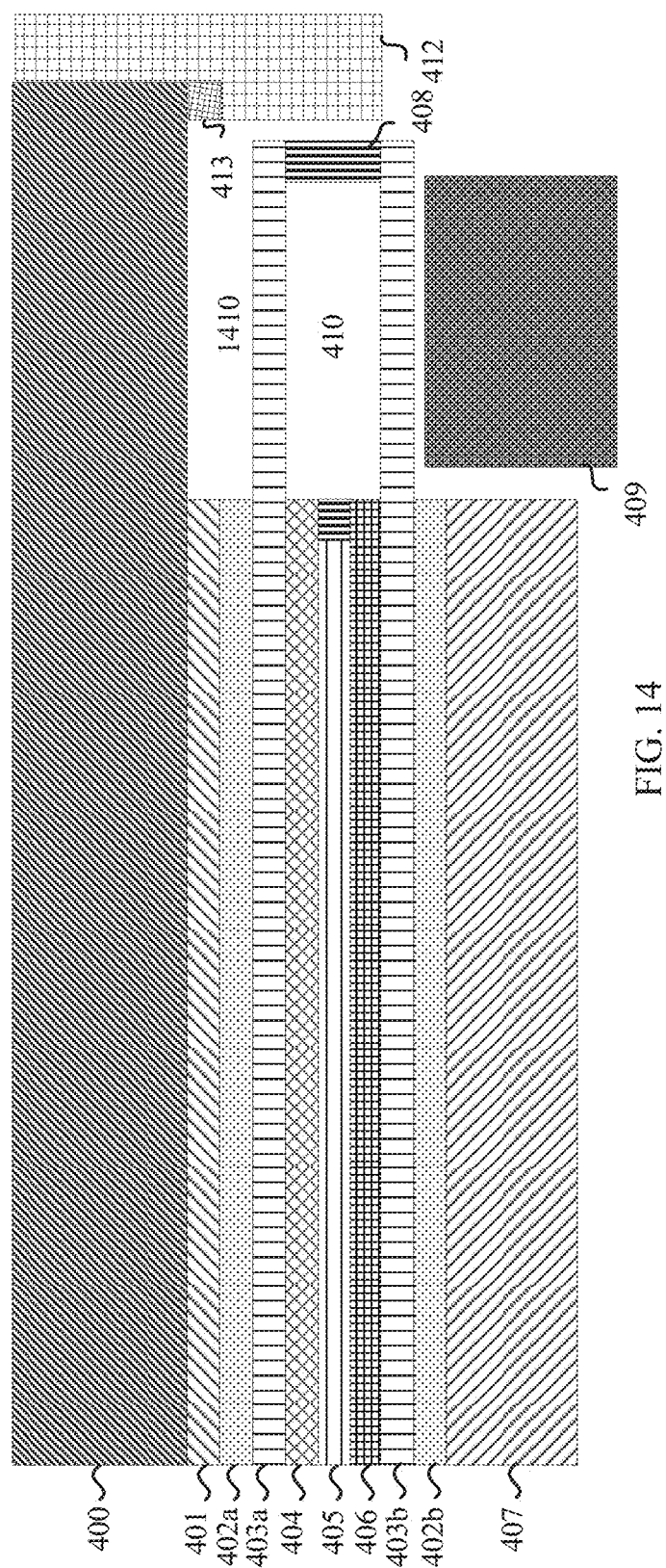
Figure 16:
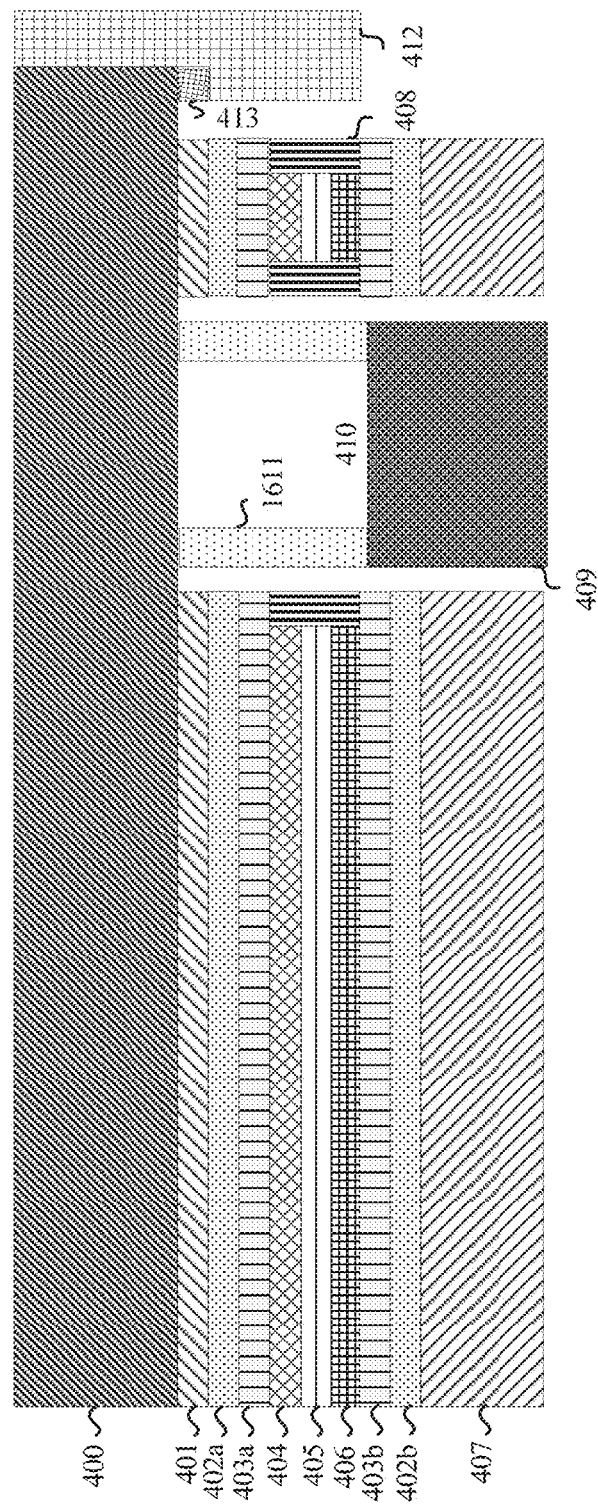
Figure 17:
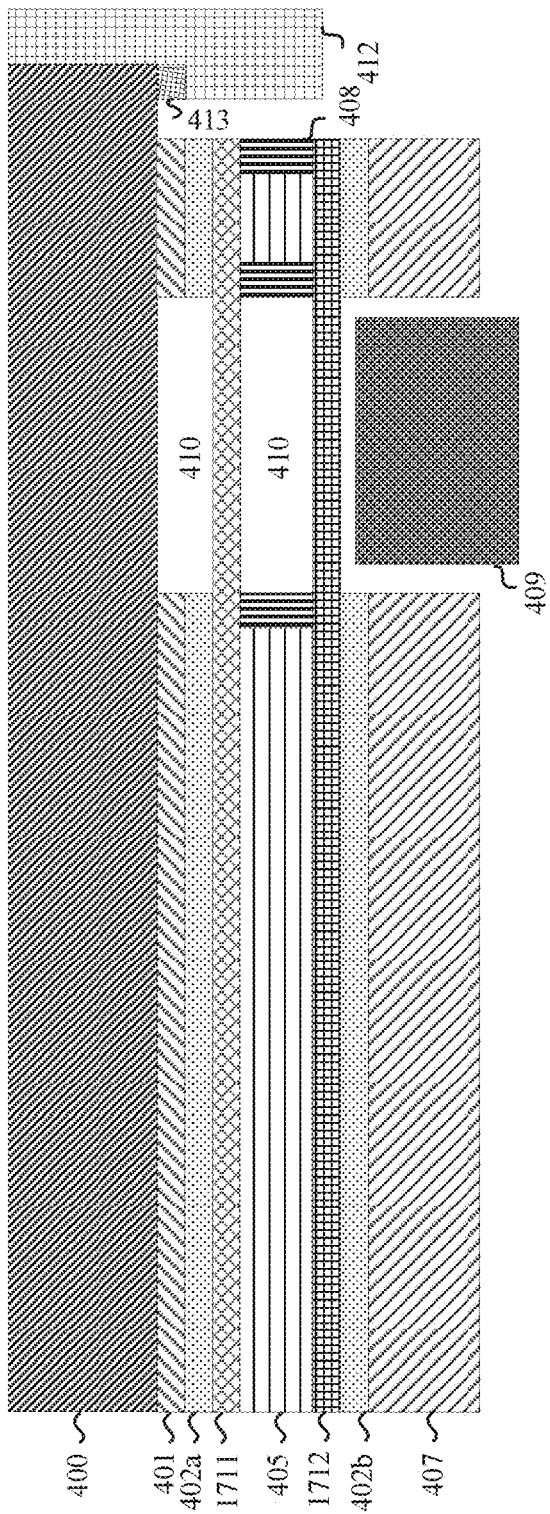
Figure 18A:
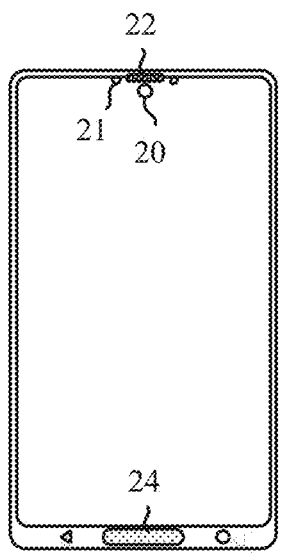
FIG. 18(a), FIG. 18(b), FIG. 18(c), FIG. 18(d), FIG. 18(e), FIG. 18(f) are a schematic diagram of a mobile phone interface according to an embodiment of the present invention.
Figure 18B:
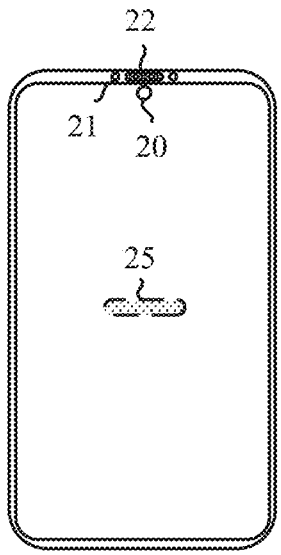
Figure 18C:
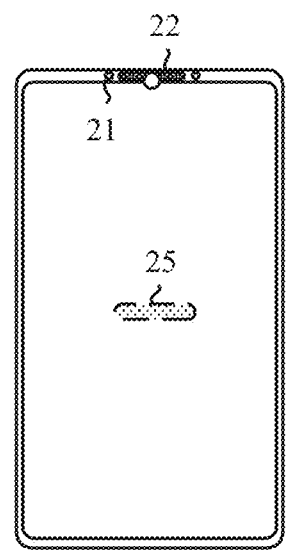
Figure 18D:
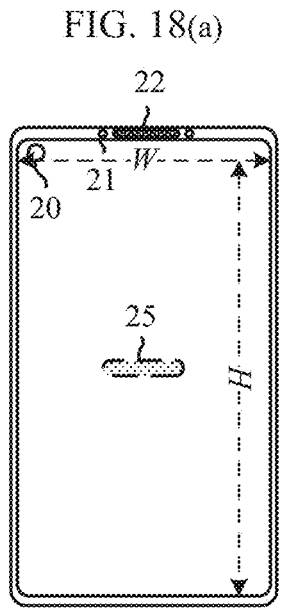
Figure 18E:
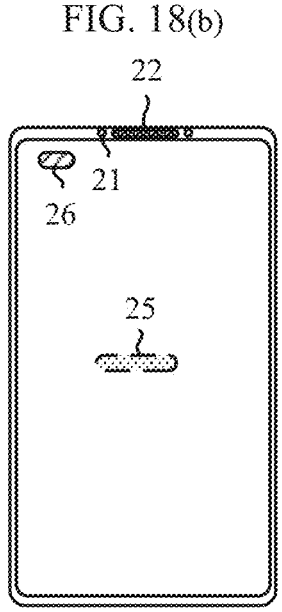
Figure 18F:
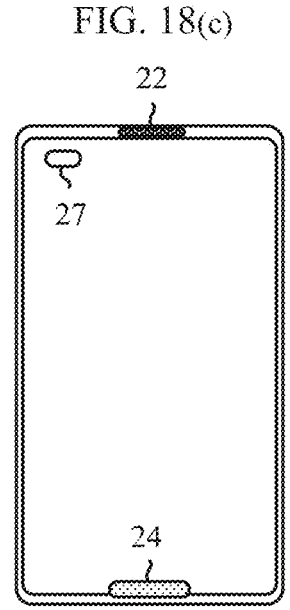

A position of a gap 1410 in FIG. 14 is different from those in FIG. 4 to FIG. 13 and FIG. 15 to FIG. 17. The transparent channel in FIG. 15 has a largest depth, and the component body 409 of the optical component may be partially disposed in the transparent channel. The component body 409 of the optical component may be completely or partially disposed under the transparent channel in other accompanying drawings. In FIG. 16, to better prevent the component body 409 of the optical component from dust interference, a sealing material 1611 may be applied to the component body 409 of the optical component, but the middle transparent channel needs to be retained. An OCA is removed from the pin-through-hole to which the sealing material 1611 is applied. When the OCA 401 is exposed to the air, the OCA is easy to be covered with dust, and a surface becomes uneven. Consequently, photographing is affected. Some of the various layers of materials in the LCD display may be synthesized. For example, in FIG. 17, the first LCD glass substrate and the CF are synthesized as a CF glass 1711, and the second LCD glass substrate and the TFT are synthesized as a TFT glass 1712.

Figure 20:
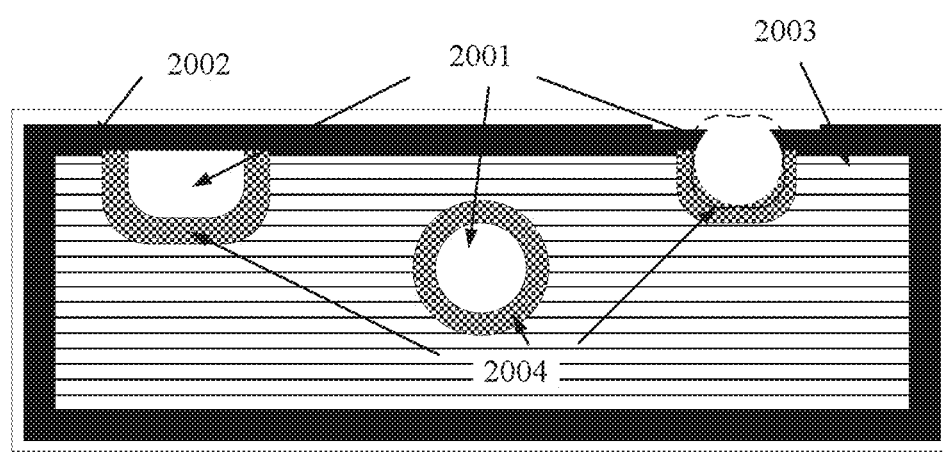
FIG. 20 is a schematic structural diagram of a local transparent region on a display according to an embodiment of the present invention.

In this embodiment of the present invention, a cutting manner such as computerized numerical control (computerized numerical control, CNC) or laser processing cutting may be used for the first polarizer, the first LCD glass substrate, the second LCD glass substrate, the second polarizer, and the backlight module. At least one pin-through-hole is disposed at the first polarizer, the second polarizer, and the backlight module. The at least one pin-through-hole may be obtained through cutting before or after the first polarizer and the second polarizer are formed on the CG cover glass. During designing of the transparent region, no non-transparent material corresponding to the transparent region may be processed, for example, the CF, the TFT, and metal cabling. For the CF, the TFT, and the metal cabling, no non-transparent material corresponding to the transparent region may be processed by designing a mask. Row-column cabling that could exist and that is interrupted by the not-processed region may be arranged around the not-processed region, and therefore, a non-transparent region with a specific width is formed. Alternatively, the row-column cabling that is interrupted may be independently arranged, row cabling is led out from a left/right side, and column cabling is led out from an upper/down side, to reduce an impact on an area of the transparent region. As shown in FIG. 19, Row-column cabling that could exist and that is interrupted by the not-processed region may be arranged around the not-processed region, and therefore, a non-transparent region with a specific width is formed. The non-transparent region may be formed through sealing by using a sealing material m. Alternatively, row-column cabling that is interrupted may be independently arranged, row cabling h is led out from a left/right side, and column cabling 1 is led out from an upper/down side, to reduce an impact on an area of the transparent region. To prevent cabling leakage, a sealing material or an ink applied to a backside of the cover glass may be used to shelter a cabling region. For example, in FIG. 20, a sealing material 2004 is used to isolate a transparent region 2001 and a liquid crystal 2003, and a silicone sealant 2002 is used to prevent the liquid crystal 2003 from leakage.

It should be noted that a production process of the LCD display is a production process related to evaporation, sputtering, and the like, and an OCA or an adhesive tape is used for bonding only between modules.

In some embodiments, the LCD display includes several transparent material layers and several non-transparent material layers that are disposed in stack mode. There is a transparent region on the LCD display. No non-transparent material is processed in the transparent region at the several non-transparent material layers, to form a component channel in the transparent region along a stacking direction. A fingerprint sensor is completely or partially disposed in the component channel of the LCD display.

In this embodiment of the present invention, the transparent region may be presented as a pin-through-hole or a gap on the LCD display. A material of the pin-through-hole or the gap on the LCD display may be implemented by skipping processing or by using a cutting process, for example, a pin-through-hole 410 in FIG. 21. Pin-through-holes or gaps are oppositely disposed along the stacking direction, to form a transparent channel on the LCD display. The component body 409 of the optical component may be completely or partially disposed under the transparent channel of the LCD display or partially disposed in the transparent channel. The pin-through-hole and the gap are two different presentation manners of the transparent region. For brevity, the pin-through-hole is used for description.

Figure 21:
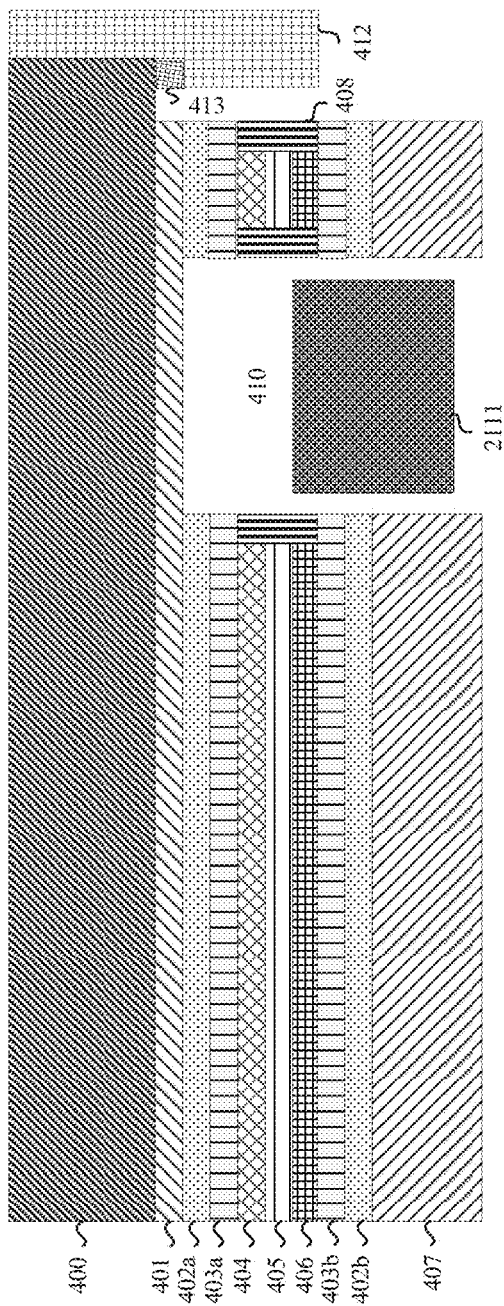
FIG. 21 is a schematic structural diagram of another LCD display according to an embodiment of the present invention.

In some embodiments, the LCD display includes several transparent material layers and several non-transparent material layers that are disposed in stack mode. There are several pin-through-holes on the LCD display that are formed at at least one layer of the several non-transparent material layers and the several transparent material layers, and the several pin-through-holes are oppositely disposed along a stacking direction, to form a component channel in the LCD display. A fingerprint sensor is partially or completely disposed in the component channel. In FIG. 21, the fingerprint sensor is completely disposed in the component channel. In this case, the mobile phone has a smallest thickness.

The non-transparent material layer is a material layer whose transmittance is less than a transmittance threshold. The transmittance threshold may be 40%, 50%, 60%, 80%, or the like. The transmittance threshold may be set based on a specific optical sensing requirement of an optical component. For example, a camera has a relatively high requirement for light transmission, and the transmittance threshold may be set to 40% to 45%.

Several pin-through-holes are disposed at at least one of the several transparent material layers, so that several transparent materials may be used to transmit light, and the pin-through-holes may be correspondingly adjusted based on a quantity of fingerprint sensors and a size of the fingerprint sensor.

In this embodiment of the present invention, the non-transparent material layer includes a first polarizer 402a, a CF 404, a liquid crystal layer 405, a TFT 406, a second polarizer 402b, and a backlight module 407. The transparent material layer includes a CG cover glass 400, a first LCD glass substrate 403a, and a second LCD glass substrate 403b. The first polarizer 402a, the first LCD glass substrate 403a, the CF 404, the liquid crystal layer 405, the TFT 406, the second LCD glass substrate 403b, the second polarizer 402b, and the backlight module 407 are sequentially stacked on a lower surface of the CG cover glass 400. In addition, the pin-through-hole 410 is disposed on all of the first polarizer 402a, the first LCD glass substrate 403a, the CF 404, the liquid crystal layer 405, the TFT 406, the second LCD glass substrate 403b, the second polarizer 402b, and the backlight module 407. The fingerprint sensor 2011 is completely disposed in the component channel. The lower surface of the CG cover glass 400 is defined based on the stacking direction of the LCD display when the LCD display of the mobile phone towards upward. Alternatively, the lower surface of the CG cover glass 400 may be defined specific to a case in which the LCD display of the mobile phone towards downward. This is not limited in this embodiment of the present invention. FIG. 21 is a schematic structural diagram of an example of an LCD display. A stacking order of the LCD display may be adjusted based on an actual design, and the LCD display may include more structures for implementing display. For brevity, details are not described herein.

In a possible embodiment, the fingerprint sensor may be an optical fingerprint sensor, a capacitive fingerprint sensor, or a digital optical recognition sensor. A display may be disposed on two sides of the sensor, to increase a screen-to-body ratio.

In this embodiment of the present invention, the several pin-through-holes are disposed on the LCD display, to form the component channel on the LCD display, so that the fingerprint sensor is partially or completely disposed in the component channel.

Figure 5:
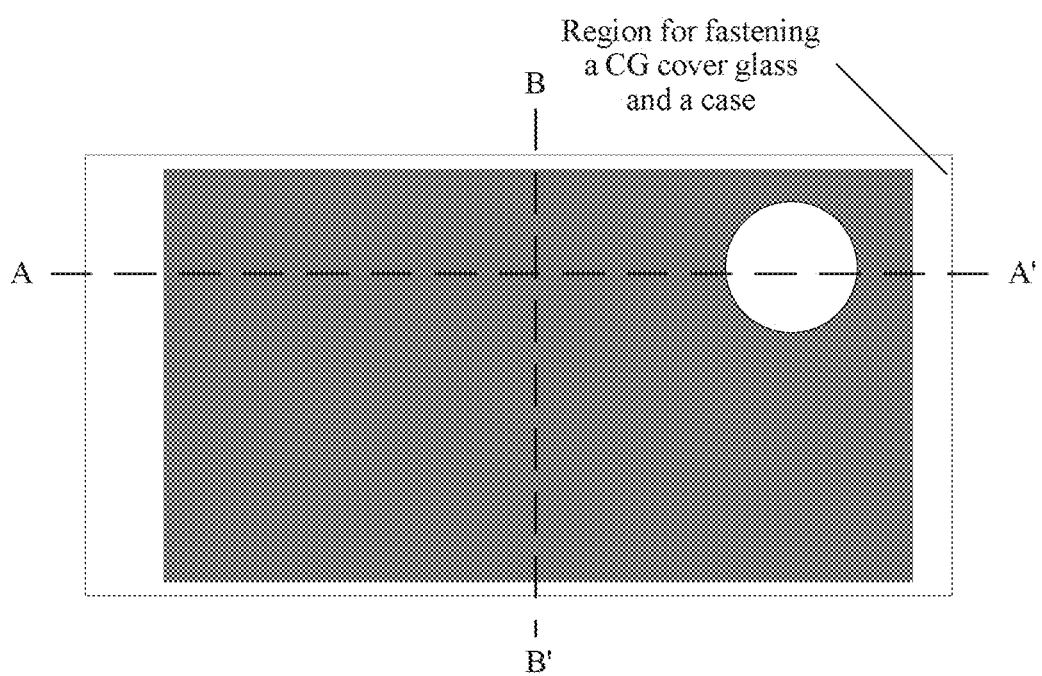

It should be noted that FIG. 5 is a cross-sectional schematic diagram along directions of AA' and BB' of a right side of FIG. 4, and FIG. 6 to FIG. 17.

In an LCD display manufacturing process, to fasten the CG cover glass 400 and a case of the mobile phone, an adhesive 413 in FIG. 4 may be used to bond the CG cover glass 400 and a structure 412, to fasten the CG cover glass 400 and the case of the mobile phone. The structure 412 may be a support structure or a cabling region. For brevity, details are not described herein.

In the foregoing embodiments of the present invention, the optical component may be any component that is configured to form an optical circuit or constitute an optical component, or an optical-related component. For example, the optical component may be a component such as an optical fingerprint sensor, a camera, an optical proximity sensor, a structured light sensor, an infrared laser transmitter, and an ambient light sensor. For example, when light passes through the camera, an image can be formed.

Certainly, the foregoing embodiments may be combined in various manners within the protection scope requested by this application.

According to the embodiments of the present invention, optical components such as a camera and an ambient light sensor, and an optical fingerprint sensor and another component may be disposed under the LCD display by using the transparent region on the LCD display, thereby greatly increasing a screen-to-body ratio and achieving a full screen effect.

Figure 22:
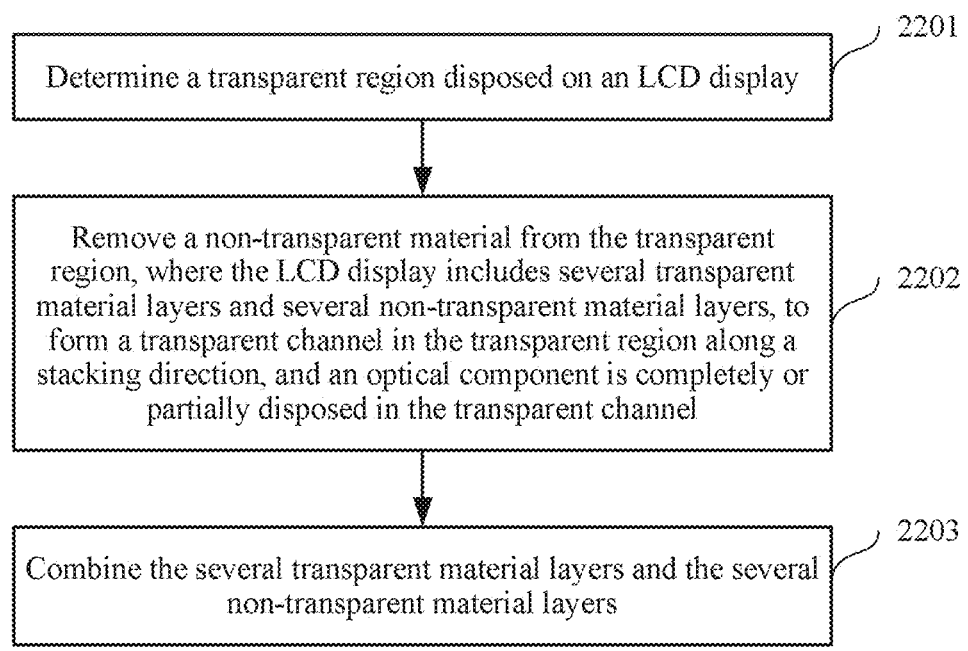
FIG. 22 is a schematic diagram of an LCD display manufacturing method according to an embodiment of the present invention.

FIG. 22 is a flowchart of an LCD display manufacturing method according to an embodiment of the present invention. As shown in FIG. 22, the LCD display manufacturing method may include the following steps.

Step 2201: Determine a transparent region disposed on an LCD display.

Step 2202: Skip processing a non-transparent material in the transparent region, where the LCD display includes several transparent material layers and several non-transparent material layers, to form a transparent channel in the transparent region along a stacking direction.

Step 2203: Combine the several transparent material layers and the several non-transparent material layers.

That no non-transparent material is processed in a local transparent region at each non-transparent material layer may be as follows: In a manufacturing process, for each non-transparent material, no non-transparent material is processed in a position of a preset local transparent region or a non-transparent material of the preset local transparent region is removed from the entire transparent material layers, so that there is no non-transparent material in the local transparent region at the non-transparent material layer.

It should be noted that both the local transparent region and the transparent region may be defined as a region, on the LCD display, that is used to transmit light to an optical component. For brevity, the local transparent region and the transparent region have a same meaning and are interchangeably used.

In this embodiment of the present invention, the transparent region may be presented as a pin-through-hole or a gap on the LCD display. A material of the pin-through-hole or the gap on the LCD display may be implemented by skipping processing or by using a cutting process, for example, a pin-through-hole in FIG. 4 to FIG. 16 and a gap in FIG. 13. Pin-through-holes or gaps are oppositely disposed along the stacking direction, to form the transparent channel on the LCD display. A component body of an optical component may be completely or partially disposed in the transparent channel of the LCD display. The pin-through-hole and the gap are two different presentation manners of the transparent region. For brevity, the pin-through-hole is used for description.

It should be noted that a quantity of pin-through-holes disposed on the non-transparent material is related to a quantity of optical components. A plurality of pin-through-holes need to be disposed if there are a plurality of optical components. In other words, the quantity of optical components may be in a one-to-one correspondence with the quantity of component channels, or a plurality of optical components are disposed in one pin-through-hole. This is specifically determined based on a process design. For ease of description, the following performs description by using an example in which one pin-through-hole is disposed at the non-transparent material layer.

In a possible embodiment, the non-transparent material layer is a material layer whose transmittance is less than a transmittance threshold. The transmittance threshold may be 40%, 50%, 60%, 80%, or the like. The transmittance threshold may be set based on a specific optical sensing requirement of an optical component. For example, a camera has a relatively high requirement for light transmission, and the transmittance threshold may be set to 40% to 45%. Therefore, the local transparent region or the transparent region described in this specification may be also a region whose transmittance meets a preset transmittance threshold.

In this embodiment of the present invention, the non-transparent material layer includes a first polarizer, a CF, a liquid crystal layer, a TFT, a second polarizer, and a backlight module. The transparent material layer includes a CG cover glass, a first LCD glass substrate, and a second glass substrate. The first polarizer, the first LCD glass substrate, the CF, the liquid crystal layer, the TFT, the second LCD glass substrate, the second polarizer, and the backlight module are sequentially stacked on a lower surface of the CG cover glass. The lower surface of the CG cover glass 400 is defined based on the stacking direction of the LCD display when the LCD display of a mobile phone towards upward. Alternatively, the lower surface of the CG cover glass 400 may be defined specific to a case in which the LCD display of the mobile phone towards downward. This is not limited in this embodiment of the present invention. FIG. 4 is a schematic structural diagram of an example of an LCD display. A stacking order of the LCD display may be adjusted based on an actual design, and the LCD display may include more structures for implementing display. For brevity, details are not described herein.

Specifically, a position for disposing the transparent region is determined. The transparent region is disposed on the LCD display. The LCD display includes the CG cover glass, the first polarizer, the first LCD glass substrate, the CF, the liquid crystal layer, the TFT, the second LCD glass substrate, the second polarizer, and the backlight module. No non-transparent material is processed in the transparent region at the first polarizer, the CF, the liquid crystal, the TFT, the second polarizer, and the backlight module, to form the transparent channel in the transparent region along the stacking direction. The CG cover glass, the first polarizer, the first LCD glass substrate, the CF, the liquid crystal, the TFT, the second LCD glass substrate, the second polarizer, and the backlight module are sequentially formed.

In this embodiment of the present invention, a cutting manner such as CNC or laser processing cutting may be used for the first polarizer, the first LCD glass substrate, the second LCD glass substrate, the second polarizer, and the backlight module. A first pin-through-hole is disposed at the first polarizer, the second polarizer, and the backlight module. The first pin-through-hole may be obtained through cutting before or after the first polarizer and the second polarizer are formed on the CG cover glass. During designing of the transparent region, no non-transparent material corresponding to the transparent region may be processed, for example, the CF, the TFT, and metal cabling. For the CF, the TFT, and the metal cabling, no non-transparent material corresponding to the transparent region may be processed by designing a mask.

According to this embodiment of the present invention, optical components such as a camera, an ambient light sensor, and an optical fingerprint sensor and another component may be disposed under the LCD display by using the transparent region on the LCD display, thereby greatly increasing a screen-to-body ratio and achieving a full screen effect.

In a possible embodiment, before the step of combining the several transparent material layers and the several non-transparent material layers, the LCD display manufacturing method further includes: skipping processing a non-transparent material in the transparent region at the several non-transparent material layers, and filling a transparent filler or a liquid crystal material.

Specifically, the liquid crystal material or the transparent filler fills a region corresponding to the transparent region between the first LCD glass substrate and the second LCD glass substrate. To be specific, the first pin-through-hole is filled with the liquid crystal material or the transparent filler, as shown in FIG. 6. Filling the region corresponding to the transparent region with the liquid crystal material does not increase implementation difficulty. In addition, if no liquid crystal material or transparent filler is dripped into the region corresponding to the transparent region, no additional production process is required, and light transmission is not affected.

Because light is partially reflected on screens for which a difference between refractive indexes is relatively large, a transmittance is reduced. For example, an air gap generated after a first pin-through-hole is disposed at the CF, the liquid crystal layer, and the TFT causes a transmittance reduction. To resolve a problem of the air gap, the first pin-through-hole disposed at the CF, the liquid crystal layer, and the TFT may be filled with a liquid crystal without adding a device or a process of another filling material.

Figure 11:
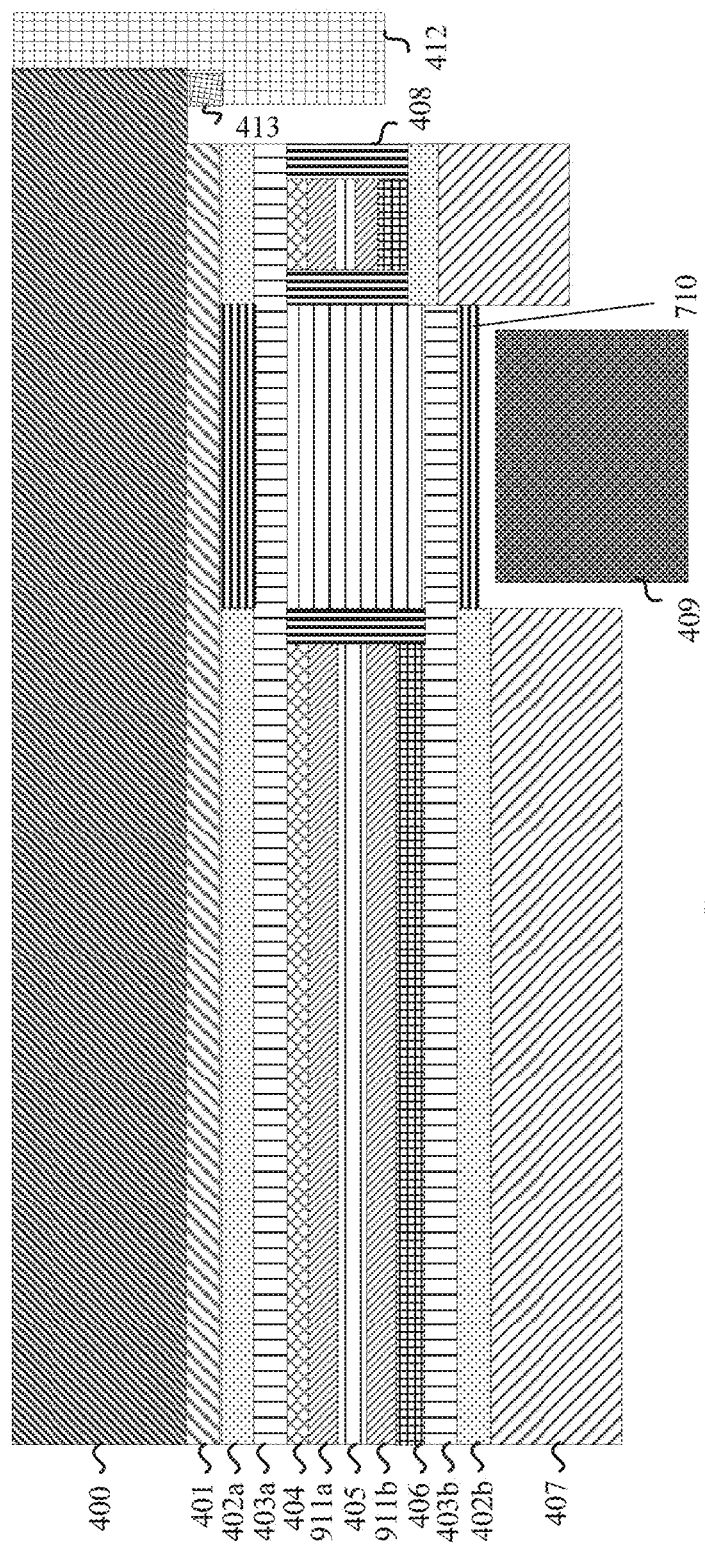

The first pin-through-hole disposed at the CF, the liquid crystal layer, and the TFT may be further filled with a transparent material. A refractive index of the transparent material may be close to refractive indexes of the first LCD glass substrate and the second LCD glass substrate. For example, the first pin-through-hole disposed at the first polarizer, the CF, the liquid crystal layer, and the TFT may be filled with an OCA, and an OCA is formed on a lower surface of the second LCD glass substrate. Different processes may be used based on different material forms of the OCA. For example, a bonding manner may be used for a solid OCA, and the first pin-through-hole disposed at the CF, the liquid crystal layer, and the TFT may be filled with the OCA, to improve an overall light transmittance. Alternatively, the transparent material may fill a first pin-through-hole disposed at the first polarizer, and the liquid crystal material fills the first pin-through-hole disposed at the CF, the liquid crystal layer, and the TFT, and the OCA is formed on the lower surface of the second LCD glass substrate, as shown in FIG. 11.

It should be noted that the first pin-through-hole disposed at the CF, the crystal layer, and the TFT is filled with the liquid crystal material. However, the filled liquid crystal material has a very low transmittance. Therefore, in an actual manufacturing process, an ITO material is retained on a lower surface of the first LCD glass substrate corresponding to the transparent region, and an ITO material is retained on an upper surface of the second LCD glass substrate. An electrical signal is applied to the ITO material, to produce an electric field for controlling liquid crystal deflection. An ITO layer is still retained in several transparent channels, and is connected to a corresponding electrical signal. For example, an ITO layer in a region corresponding to a second pin-through-hole on the first LCD glass substrate is also connected to an ITO layer in another region, and a same electrical signal is used; and an ITO layer in a region corresponding to a second pin-through-hole on the second LCD glass substrate is connected to an independent control electrical signal, for example, a control electrical signal of one or several pixels in an original region corresponding to the transparent channel may be used. Voltage is applied to the two ITO layers, to produce an electric field for controlling deflection of a liquid crystal material in transparent channels, so that a large amount of light can pass through the regions corresponding to the pin-through-holes, thereby achieving a local transparent effect, as shown in FIG. 8.

Specifically, there is still an ITO layer on the lower surface of the first LCD glass substrate and an ITO layer on the upper surface of the second LCD glass substrate.

In a possible embodiment, the transparent material further includes a first alignment film and a second alignment film. A liquid crystal material is dripped between a lower surface of the first alignment film and an upper surface of the second alignment film, as shown in FIG. 4.

In a possible embodiment, the liquid crystal material is dripped between the lower surface of the first alignment film and the upper surface of the second alignment film, to form the liquid crystal layer. No first alignment film or second alignment film is processed in a region of the first pin-through-hole, and the first pin-through-hole is filled with the liquid crystal material. Due to lack of the first alignment film and the second alignment film in the region, alignments in the liquid crystal layer are disordered, and liquid crystal materials in the liquid crystal layer are represented as isotropic materials, so that a large amount of light can normally pass through the region, thereby achieving a local transparent effect, as shown in FIG. 9.

Figure 10:
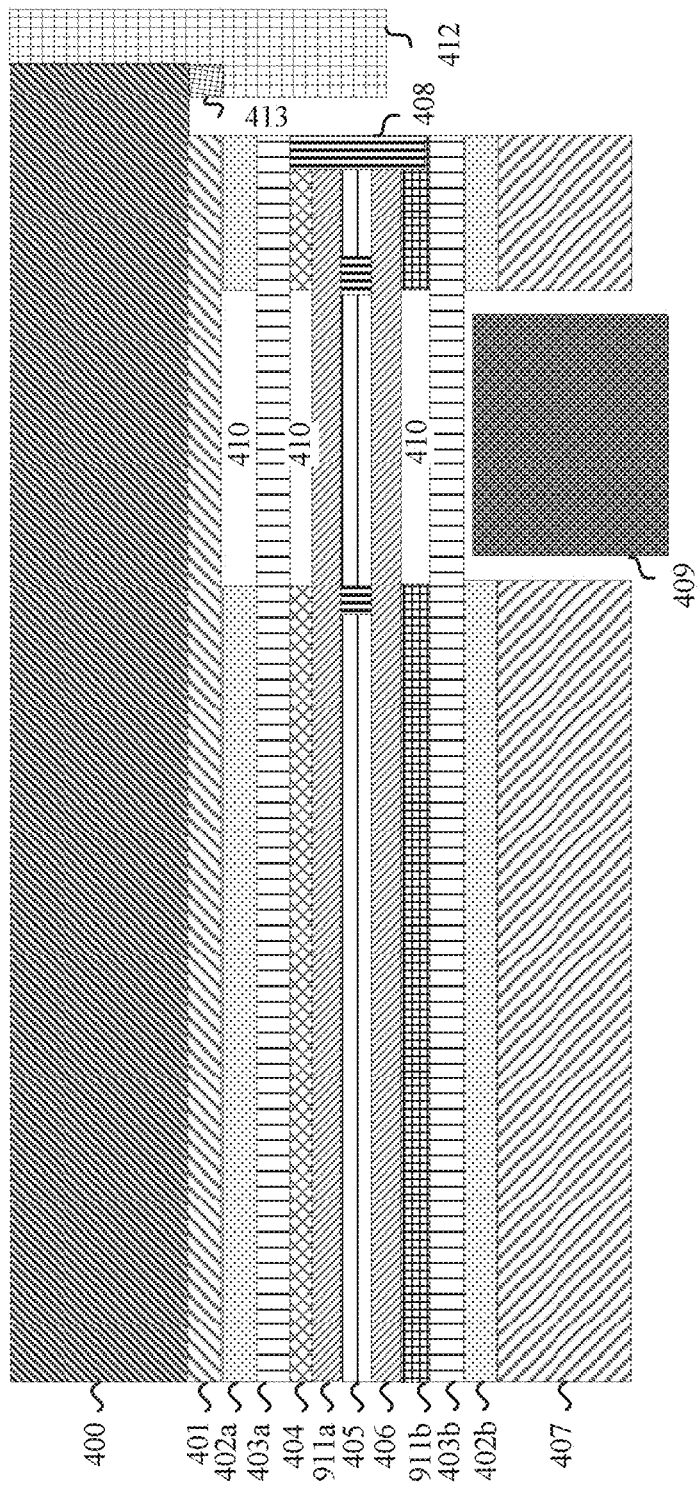

In a possible embodiment, the liquid crystal material is dripped between the lower surface of the first alignment film and the upper surface of the second alignment film, to form the liquid crystal layer. The first alignment film and the second alignment film are processed in the first pin-through-hole, and the first pin-through-hole is filled with the liquid crystal material. When light needs to be transmitted, the first alignment film and the second alignment film in the first pin-through-hole are powered on, so that the first alignment film and the second alignment film in the first pin-through-hole are invalid, alignments in the liquid crystal layer are disordered, and liquid crystal materials in the liquid crystal layer are represented as isotropic materials. In this way, a large amount of light can normally pass through the region, thereby achieving a local transparent effect, as shown in FIG. 10.

In a possible embodiment, the first alignment film and the second alignment film may be processed only in a region of the first pin-through-hole. When light needs to be transmitted, the first alignment film and the second alignment film that are processed in the region of the first pin-through-hole are powered on, so that the first alignment film and the second alignment film in the first pin-through-hole are invalid, alignments in the liquid crystal layer are disordered, and liquid crystal materials in the liquid crystal layer are represented as isotropic materials. In this way, a large amount of light can normally pass through the region, thereby achieving a local transparent effect.

In a possible embodiment, before the step of combining the several transparent material layers and the several non-transparent material layers, the method further includes: cutting off a transparent material from the first LCD glass substrate and the second LCD glass substrate in the transparent region, to form the transparent channel in the transparent region along the stacking direction.

Figure 12:
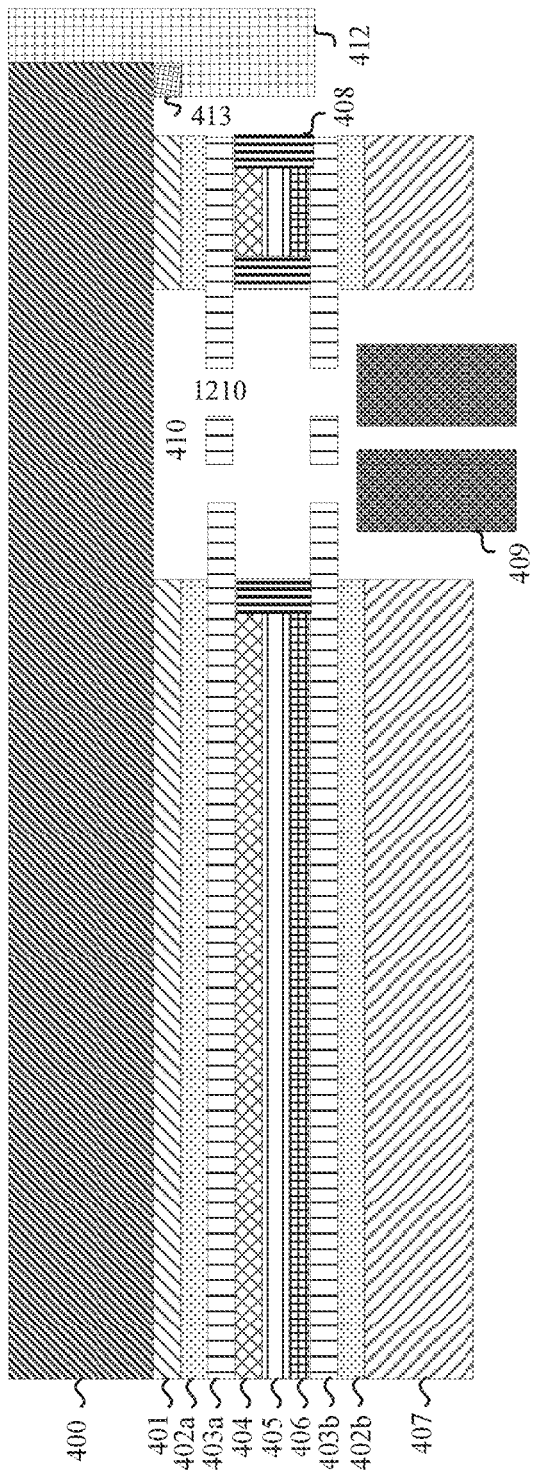

Specifically, the transparent material of the first LCD glass substrate and the second LCD glass substrate in the transparent region is removed. In other words, a second pin-through-hole corresponding to the first pin-through-hole is disposed on the first LCD glass substrate and the second LCD glass substrate. A quantity of second pin-through-holes is related to a quantity of cameras, receivers, photosensitive components, or physical buttons. For example, when there are two cameras, two second pin-through-holes are disposed on each of the first LCD glass substrate and the second LCD glass substrate, as shown in FIG. 12.

In a possible embodiment, before the step of combining the several transparent material layers and the several non-transparent material layers, the method further includes: processing a transparent material in the transparent channel at the several transparent material layers.

Specifically, the transparent material is processed in the transparent channel at the several transparent material layers, to form the transparent channel in the transparent region in stack mode. No additional manufacture process is needed, manufacture costs are reduced, and a full screen display effect is not affected. In addition, the transparent material is retained in the transparent region at the several transparent material layers, so that mechanical strength of the LCD display can be increased, and overall quality of the LCD display can be improved.

It should be noted that the transparent channel is formed in stack mode when no non-transparent material is processed in the transparent region at the several non-transparent material layers.

In a possible embodiment, before the step of combining the several transparent material layers and the several non-transparent material layers, the method further includes: cutting off a transparent material from the CG cover in the transparent region, to form the transparent channel in the transparent region along the stacking direction.

Specifically, the transparent material of the CG cover in the transparent region is removed, so that a third pin-through-hole corresponding to the first pin-through-hole is disposed on the CG cover glass. A region that is of the CG cover glass and that is corresponding to the third pin-through-hole is removed, so that the third pin-through-hole is corresponding to the first pin-through-hole. The third pin-through-hole is disposed to transmit voice for an acoustic component disposed under the LCD display. A quantity of third pin-through-holes is related to a quantity of acoustic components, as shown in FIG. 13.

In a possible embodiment, a sealing material is applied to a periphery of the transparent channel of the several non-transparent layers.

Specifically, the sealing material is applied to a periphery of the first pin-through-hole disposed at the liquid crystal layer.

In a possible embodiment, a length-width ratio of a display dimension of a rectangular display region without a transparent channel in a display region is 16:9 or 18:9.

Specifically, in FIG. 18 (*d*), for a screen under the transparent region, namely, a screen excluding the transparent region, a length of the screen is H, and a width of the screen is W. The H/W ratio of the screen may be 18:9, 16:9, or 4:3, so that experience in watching a film or a video, viewing an image, or the like is not affected by the transparent region.

It should be noted that, the transparent region is disposed on the LCD display, and regions, corresponding to the transparent region, of the first polarizer, the first LCD glass substrate, the CF, the liquid crystal layer, the TFT, the second LCD glass substrate, the second polarizer, and the backlight module on the LCD display are separately removed. The regions may be removed after or before the first polarizer, the first LCD glass substrate, the CF, the liquid crystal layer, the TFT, the second LCD glass substrate, the second polarizer, and the backlight module are formed.

According to this embodiment of the present invention, optical components such as the camera and the ambient light sensor and another component may be disposed under the display by using the transparent region on the LCD display, thereby greatly increasing a screen-to-body ratio and achieving a full screen effect.

The following describes the LCD display manufacturing method provided in the embodiments of the present invention with reference to Embodiment 1, Embodiment 2, and Embodiment 3.

Embodiment 1

In a possible embodiment, the first polarizer and the second polarizer are used, and the first polarizer and the second polarizer are partially removed from a specific region. Light penetrated into a specific region on the first LCD glass substrate may be considered as natural light. No non-high-transmittance material such as the CF, a metal line, and the TFT component is processed in the specific region, and a silicone sealant is applied, so that there is no liquid crystal in the specific region. In this way, a large amount of light can pass through the region, thereby achieving a local transparent effect, as shown in FIG. 4.

Specifically, the LCD display manufacturing method may include the following steps.

Step 1: Determine, based on a design requirement of the entire machine, a region that needs to be transparent on the LCD display, and remove regions corresponding to the first polarizer and the second polarizer on the LCD display, where the regions may be removed before the polarizers are formed on the glasses or after the polarizers are laminated on the glasses. The transparent region may be completely inside the display region or on an edge of the display region.

Step 2: Skip, based on the designed transparent region, processing a non-transparent material layer such as the CF, the TFT, and metal cabling corresponding to the transparent region during manufacturing of the LCD display, and during processing the CF and the TFT corresponding to the transparent region, directly skip processing the CF and the TFT corresponding to the transparent region by designing a mask. Row-column cabling that could exist and that is interrupted by the region may be arranged around the region, and therefore, a non-transparent region with a specific width is formed. Alternatively, the row-column cabling that is interrupted may be independently arranged, and the cabling is separately led out from a nearby left/right side or upper/lower side, to reduce an impact on an area of the transparent region, as shown in FIG. 19.

Step 3: Process a sealing adhesive or another sealing material on a periphery of the transparent region on the first LCD glass substrate and the second LCD glass substrate that are corresponding to the transparent region, so that there is no liquid crystal in a region isolated by using the sealing material, and a large amount of light can pass through the LCD display. In addition, a sealing material or an ink applied to a backside of the cover glass may be used to shelter a cabling region.

Step 4: Because the backlight module of the LCD display is non-transparent, hollow out a part corresponding to the transparent region during designing of the backlight module, and partially extend a component body of a component such as a camera into a hollow-out part based on a thickness of the hollow-out part, to reduce a thickness of the entire machine.

Step 5: Because light is partially reflected on screens for which a difference between refractive indexes is relatively large, and a transmittance is reduced, for example, air gaps generated after the foregoing materials on the LCD display are removed cause a transmittance reduction, fill the air gaps with a material such as an OCA whose refractive index is close to those of the first LCD glass substrate and the second LCD glass substrate, to increase an overall light transmittance, or coat a lower surface of the second LCD glass substrate with an AR antireflective film, to further increase the transmittance and provide a good optical basis for an optical component such as the camera.

Specifically, an air gap between the CG cover glass and the LCD glass substrate may be filled with an original OCA, and another layer of the OCA may be further used or a liquid OCA may be used to fill the gap.

Step 7: Combine and lay out the LCD display and the camera, an ambient light sensor, an optical proximity sensor, or another component, to achieve a full screen effect.

It should be noted that step 1, step 2, and step 4 may be performed simultaneously or separately, and an execution order is not limited.

According to an improved LCD display structure and an implementation method of the improved LCD display structure provided in the present invention, a hole is disposed in a structure material other than a glass, to achieve local transparency. In comparison with the prior art, there is no need to use an OLED display, and there is no need to remove a glass to achieve a transparent effect. Therefore, there are more advantages in good productivity, reliability, and costs.

Embodiment 2

In Embodiment 2 of the present invention, the first polarizer and the second polarizer on which different shapes of holes are formed are used. In other words, the polarizers are partially removed from a specific region, so that light penetrated into the specific region on an LCD glass is still natural light. In addition, no non-high-transmittance material such as the CF, a metal line, and the TFT component is manufactured in the specific region. Further, an alignment film in the region is made to become invalid, alignments of liquid crystals are disordered, and the liquid crystals are represented as isotropic materials, so that a large amount of light can normally pass through the region, to achieve a local transparent effect. No other transparent materials such as an alignment film and ITO cabling may be processed, to further increase a transmittance, as shown in FIG. 9.

Step 1: Determine, based on a design requirement of the entire machine, a region that needs to be transparent on the LCD display, and remove regions corresponding to the first polarizer and the second polarizer on the LCD display, where the regions may be removed before or after the polarizers are laminated on the glasses. The transparent region may be completely inside the display region or on an edge of the display region.

Step 2: Skip, based on the designed transparent region, processing a non-transparent material layer such as the CF, the TFT, and metal cabling corresponding to the transparent region during manufacturing of the LCD display, and during processing of the CF 404 and the TFT 406 corresponding to the transparent region, directly skip processing the CF and the TFT corresponding to the transparent region by designing a mask. Row-column cabling that could exist and that is interrupted by the region may be arranged around the region, and therefore, a non-transparent region with a specific width is formed. Alternatively, the row-column cabling that is interrupted may be independently arranged, and the cabling is separately led out from a nearby left/right side or upper/lower side, to reduce an impact on an area of the transparent region, as shown in FIG. 19.

Step 3: Process a sealing adhesive or another isolation material on a periphery of the transparent region on the first LCD glass substrate and the second LCD glass substrate, and make an alignment film in the region invalid, so that liquid crystals in the transparent region are in random directions, and the liquid crystals present an isotropic feature, and a large amount of light can normally pass through the LCD display.

Step 4: Because the backlight module of the LCD display is non-transparent, hollow out a part corresponding to the transparent region during designing of the backlight module, and partially extend a component body of a component such as a camera into a hollow-out part based on a thickness of the hollow-out part, to reduce a thickness of the entire machine.

Step 5: Because light is partially reflected on screens for which a difference between refractive indexes is relatively large, and a transmittance is reduced, for example, air gaps generated after the foregoing materials on the LCD display are removed cause a transmittance reduction, fill the air gaps with a material such as an OCA whose refractive index is close to those of the first LCD glass substrate and the second LCD glass substrate, to increase an overall light transmittance, or coat a lower surface of the second LCD glass substrate with an AR antireflective film, to further increase the transmittance and provide a good optical basis for an optical component such as the camera.

Specifically, an air gap between the CG cover glass 400 and the LCD glass substrate 403 may be filled with an original OCA, and another layer of the OCA may be further used or a liquid OCA may be used to fill the gap.

Step 7: Combine and lay out the LCD display and the camera, an ambient light sensor, an optical proximity sensor, or another component, to achieve various full screen effects.

It should be noted that step 1, step 2, and step 4 may be performed simultaneously or separately, and an execution order is not limited.

According to this embodiment of the present invention, an existing liquid crystal may be used to fill an isolation region between the first LCD glass substrate and the second LCD glass substrate without adding a device or a process of another filling material.

Embodiment 3

In Embodiment 3 of the present invention, a local non-display region is designed in a display region on the LCD display. There is no liquid crystal, metal cabling, TFT component, or another structure in the region, and the region is removed, so that a large amount of light normally passes through the region, to achieve a local transparent effect, as shown in FIG. 12.

Specifically, the LCD display manufacturing method may include the following steps.

Step 1: Determine, based on a design requirement of the entire machine, a region that needs to be local transparent on the LCD display, and remove regions corresponding to the first polarizer and the second polarizer on the LCD display, where the regions may be removed before the polarizers are laminated on the first LCD glass substrate and the second LCD glass substrate or the regions may be removed together with the first LCD glass substrate and the second LCD glass substrate after the polarizers are laminated on the first LCD glass substrate and the second LCD glass substrate. The transparent region may be completely inside the display region or on an edge of the display region.

Step 2: Skip, based on the designed transparent region, processing a non-transparent material layer such as the CF 404, the TFT component 406, and metal routing corresponding to the region during manufacturing of the LCD liquid crystal display, and during processing of the CF 404 and the TFT 406 corresponding to the transparent region, directly skip processing the region by designing a mask. Row-column cabling that could exist and that is interrupted by the region may be arranged around the region, and therefore, a non-transparent region with a specific width is formed. Alternatively, the row-column cabling that is interrupted may be independently arranged, and the cabling is separately led out from a nearby left/right side or upper/lower side, to reduce an impact on an area of the transparent region.

Step 3: Process a sealing adhesive or another sealing material on a periphery of the transparent region on the first LCD glass substrate and the second LCD glass substrate, so that there is no liquid crystal in a region isolated by using the sealing material; use a sealing material or an ink applied to a backside of the CG cover glass to shelter a cabling region; and completely remove the transparent region from the display by using a processing method such as using a cutting wheel or laser cutting.

Step 4: Because the backlight module of the LCD display is non-transparent, hollow out a part corresponding to the transparent region during designing of the backlight module, and partially extend a component body of a component such as a camera into a hollow-out part based on a thickness of the hollow-out part, to reduce a thickness of the entire machine.

Step 5: Because light is partially reflected on screens for which a difference between refractive indexes is relatively large, and a transmittance is reduced, coat an inner side of the CG cover glass 400 of the LCD with an AR antireflective film, to further increase a transmittance and provide a good optical basis for an optical component such as the camera.

It should be noted that an OCA between the CG cover glass 400 and the first LCD glass substrate and an OCA between the first LCD glass substrate and the second LCD glass substrate may also be removed from the transparent region.

Step 6: Combine and lay out the camera, an ambient light sensor, an optical proximity sensor, or another component, to achieve a full screen effect.

It should be noted that step 1, step 2, and step 4 may be performed simultaneously or separately, and an execution order is not limited.

Technical effects of Embodiment 3 of the present invention are as follows: there is no need to fill an air gap between the CG glass cover and the first LCD glass substrate, and a thickness of the display in the transparent region may be further used by another component, thereby reducing an overall thickness.

According to the embodiments of the present invention, a structure of the LCD display is designed to implement local transparency, so that outside light can enter components such as the camera, the ambient light sensor, the optical sensor, and the optical fingerprint sensor that are disposed under the LCD display, and in combination with layout optimization of components such as the camera and a receiver, a structure in which the components and another component are disposed under the display is implemented, the screen-to-body ratio is greatly increased, and the full screen effect is achieved.

The steps in the method or algorithm described in the embodiments disclosed in this specification may be implemented by hardware, a software module executed by the processor, or a combination of hardware and software. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention shall fall within the protection scope of the present invention.

The invention claimed is:

1. An electronic device, comprising:
    a liquid-crystal display (LCD) disposed in the electronic device and comprising:
        a stack of non-transparent material layers and transparent material layers, wherein the non-transparent material layers comprise a color film (CF), a liquid crystal layer, a thin-film transistor (TFT) layer, and a backlight; and
        a local transparent region, wherein the local transparent region forms a transparent channel by comprising pin through-holes in the CF, the liquid crystal layer, the TFT layer, and the backlight in the local transparent region; and
    an optical component comprising a component body, wherein the component body is completely or partially disposed at a position in the pin through-hole in the backlight and beneath the pin through-holes in the CF, the liquid crystal layer, and the TFT layer.

2. The electronic device of claim 1, wherein the pin through-holes in the CF, the liquid crystal layer, the TFT layer, and the backlight are filled with a transparent filler or a liquid crystal material.

3. The electronic device of claim 1, wherein the transparent material layers comprise a cover glass (CG), a first LCD glass substrate, and a second LCD glass substrate, wherein the non-transparent material layers further comprise a first polarizer and a second polarizer, and wherein the first polarizer, the first LCD glass substrate, the CF, the liquid crystal layer, the TFT layer, the second LCD glass substrate, the second polarizer, and the backlight are sequentially formed on a lower surface of the CG.

4. The electronic device of claim 3, wherein the CG covers the pin through-holes.

5. The electronic device of claim 3, wherein the transparent material layers further comprise a first iridium titanium oxide (ITO) material layer and a second ITO material layer, wherein the first ITO material layer is formed in the local transparent region and on a lower surface of the first LCD glass substrate, and wherein the second ITO material layer is formed in the local transparent region and on an upper surface of the second LCD glass substrate.

6. The electronic device of claim 3, wherein the transparent material layers further comprise a first alignment film and a second alignment film, and wherein the liquid crystal layer is formed between a lower surface of the first alignment film and an upper surface of the second alignment film.

7. The electronic device of claim 1, wherein the transparent material layers are retained in the transparent channel.

8. The electronic device of claim 1, wherein the local transparent region comprises a sealing material applied to a periphery of the pin through-holes.

9. The electronic device of claim 1, wherein the LCD comprises a rectangular display region having a length-width ratio of 16:9 or 18:9.

10. The electronic device of claim 1, wherein the optical component comprises at least one of the following: an optical fingerprint sensor, a camera, an optical proximity sensor, a structured light sensor, an infrared laser transmitter, or an ambient light sensor.

11. The electronic device of claim 1, wherein the LCD further comprises a metal line and a sealing material, wherein the metal line is between the TFT layer and the CF and is distributed around the pin through-holes, and wherein the sealing material covers a part of the metal line around the pin through-holes.

12. A liquid crystal display (LCD) configured to be disposed in an electronic device, wherein the LCD comprises:
    a stack comprising transparent material layers and non-transparent material layers, wherein the non-transparent material layers comprise a color film (CF), a liquid crystal layer, a thin film transistor (TFT) layer, and a backlight; and
    a local transparent region, wherein the local transparent region forms a transparent channel by comprising pin through-holes in the CF, the liquid crystal layer, the TFT layer, and the backlight, and wherein local transparent region is configured to accommodate a component body of an optical component of the electronic device completely or partially at a position in the pin through-hole in the backlight and beneath the pin through-holes in the CF, the liquid crystal layer, and the TFT layer.

13. The LCD of claim 12, wherein the pin through-holes in the CF, the liquid crystal layer, the TFT layer, and the backlight are filled with a transparent filler or a liquid crystal material.

14. The LCD of claim 12, wherein the transparent material layers comprise a cover glass (CG), a first LCD glass substrate, and a second LCD glass substrate, wherein the non-transparent material layers further comprise a first polarizer and a second polarizer, and wherein the first polarizer, the first LCD glass substrate, the CF, the liquid crystal layer, the TFT layer, the second LCD glass substrate, the second polarizer, and the backlight are sequentially formed on a lower surface of the CG.

15. The LCD of claim 14, wherein the CG covers the pin through-holes.

16. The LCD of claim 14, wherein the transparent material layers further comprise a first iridium titanium oxide (ITO) material layer and a second ITO material layer, wherein the first ITO material layer is formed in the local transparent region and on a lower surface of the first LCD glass substrate, and wherein the second ITO material layer is formed in the local transparent region and on an upper surface of the second LCD glass substrate.

17. The LCD of claim 14, wherein the transparent material layers further comprise a first alignment film and a second alignment film, and wherein the liquid crystal layer is formed between a lower surface of the first alignment film and an upper surface of the second alignment film.

18. The LCD of claim 12, wherein the transparent material layers are retained in the transparent channel.

19. The LCD of claim 12, wherein the local transparent region comprises a sealing material applied to a periphery of the pin through-holes.

20. The LCD of claim 12, wherein the LCD further comprises a metal line and a sealing material, wherein the metal line is between the TFT layer and the CF and is distributed around the pin through-holes, and wherein the sealing material covers a part of the metal line around the pin through-holes.

* * * * *